(12) United States Patent
Bruce

(10) Patent No.: US 11,507,937 B2
(45) Date of Patent: Nov. 22, 2022

(54) INFORMATIVE APPARATUS AND METHOD

(71) Applicant: Branded Seats USA, LLC, San Diego, CA (US)

(72) Inventor: Shad E. Bruce, San Diego, CA (US)

(73) Assignee: BRANDED SEATS USA, LLC, San Diego, CA (US)

( * ) Notice: Subject to any disclaimer, the term of this patent is extended or adjusted under 35 U.S.C. 154(b) by 1 day.

(21) Appl. No.: 16/843,613

(22) Filed: Apr. 8, 2020

(65) Prior Publication Data

US 2020/0320911 A1    Oct. 8, 2020

Related U.S. Application Data

(60) Provisional application No. 62/831,003, filed on Apr. 8, 2019.

(51) Int. Cl.
*G06Q 30/00* (2012.01)
*G06Q 20/32* (2012.01)
*G09F 13/04* (2006.01)
*G09F 23/00* (2006.01)
*G06Q 30/02* (2012.01)
(Continued)

(52) U.S. Cl.
CPC ......... *G06Q 20/3276* (2013.01); *G06N 20/00* (2019.01); *G06Q 20/3278* (2013.01); *G06Q 30/0255* (2013.01); *G06Q 30/0267* (2013.01); *G09F 13/04* (2013.01); *G09F 23/00* (2013.01); *H04W 4/80* (2018.02); *G09F 2023/005* (2013.01)

(58) Field of Classification Search
CPC ........... G06Q 20/3276; G06Q 20/3278; G06Q 30/0255; G06Q 30/0267; H04W 4/80; G09F 13/04; G09F 23/00; G09F 2023/005
See application file for complete search history.

(56) References Cited

U.S. PATENT DOCUMENTS 1,262,788 A    4/1918    Heidenreich
4,697,780 A    10/1987    Wenkman et al.
(Continued)

FOREIGN PATENT DOCUMENTS

JP    2006230818 A    9/2006
KR    200258661 Y1    12/2001

OTHER PUBLICATIONS

Bao'an Firm Supplies LED Screens to World Cup, Shenzhen Daily, Jun. 22, 2018 (Year: 2018).*
(Continued)

*Primary Examiner* — Matthew L Hamilton
(74) *Attorney, Agent, or Firm* — Peter B. Scull; Jared A. Barnard; EIP US LLP

(57) ABSTRACT

An apparatus, system, and methods for displaying information and advertisements in public or private venues including a body portion adapted to a seat structure or other seat supported apparatus, either as a base unit or a retrofit apparatus, wherein the seat structure or seating apparatus may provide the structure and housing for electronics necessary to power and control an electronic display that may be disposed on an adjustable modular bracket system that may be attached to a seat, a seat back, a cupholder, a cupholder attachment apparatus, a portable or mobile device attachment apparatus, which may be accessible, visible, and/or useable by a patron at a public venue.

20 Claims, 17 Drawing Sheets

(51) Int. Cl.
*H04W 4/80* (2018.01)
*G06N 20/00* (2019.01)

(56) References Cited

U.S. PATENT DOCUMENTS

| | | |
|---|---|---|
| 4,872,022 A | 10/1989 | Schock |
| D307,852 S | 5/1990 | Clark |
| 4,951,596 A | 8/1990 | Wallace, Jr. |
| 5,052,649 A | 10/1991 | Hunnicutt |
| 5,153,042 A | 10/1992 | Indrelie |
| 5,169,108 A | 12/1992 | Carlson |
| D353,289 S | 12/1994 | Ayotte et al. |
| 5,421,638 A | 6/1995 | Ayotte et al. |
| 5,435,511 A | 7/1995 | Hsu |
| D365,250 S | 12/1995 | Bergin et al. |
| D367,997 S | 3/1996 | Ayotte et al. |
| D368,628 S | 4/1996 | Bergin |
| D377,439 S | 1/1997 | Ayotte et al. |
| 5,628,103 A | 5/1997 | Ayotte et al. |
| D380,125 S | 6/1997 | Ayotte et al. |
| D380,652 S | 7/1997 | Ayotte et al. |
| D383,362 S | 9/1997 | Ayotte et al. |
| 5,709,429 A | 1/1998 | Bergin |
| 5,745,565 A | 4/1998 | Wakefield |
| D398,127 S | 9/1998 | Bergin et al. |
| 5,813,644 A | 9/1998 | Bergin |
| D400,678 S | 11/1998 | Clark et al. |
| 5,897,041 A | 4/1999 | Ney et al. |
| 5,938,091 A | 8/1999 | Bergin et al. |
| D423,836 S | 5/2000 | Bergin |
| D425,012 S | 5/2000 | Bergin |
| 6,186,382 B1 | 2/2001 | Bergin et al. |
| 6,237,262 B1 | 5/2001 | Alvern |
| 6,283,551 B1 | 9/2001 | Bergin |
| D456,691 S | 5/2002 | Bergin |
| 6,457,772 B1 | 10/2002 | Forston |
| 6,478,371 B1 | 11/2002 | Clarke |
| 6,641,101 B2 | 11/2003 | Bergin |
| 6,739,652 B2 | 5/2004 | Welsh |
| D505,032 S | 5/2005 | Bergin |
| 6,976,735 B1 | 12/2005 | Bergin |
| 7,090,085 B1 | 8/2006 | Vicendese et al. |
| RE39,392 E | 11/2006 | Bergin |
| 7,149,078 B2 * | 12/2006 | Schedivy .............. B60N 2/64 348/827 |
| 7,275,729 B2 | 10/2007 | Sherman et al. |
| 7,383,650 B2 | 6/2008 | Duesler |
| 7,445,185 B1 | 11/2008 | Cicero |
| 7,614,703 B2 | 11/2009 | Bergin |
| 7,665,804 B1 * | 2/2010 | Jeffrey .................. G09F 21/04 297/220 |
| 7,681,346 B2 | 3/2010 | Bruce |
| 7,766,293 B2 | 8/2010 | Seidl et al. |
| 7,815,123 B2 | 10/2010 | Conner et al. |
| 7,959,121 B1 | 6/2011 | Barnes, Jr. |
| 8,231,094 B1 | 7/2012 | Barnes, Jr. |
| 8,441,779 B2 | 5/2013 | Floros |
| 8,636,319 B1 | 1/2014 | Parker, Jr. |
| 8,657,245 B2 | 2/2014 | Stangl et al. |
| 8,714,505 B1 | 5/2014 | Stangl et al. |
| 8,757,573 B1 | 6/2014 | Barnes, Jr. |
| 8,833,596 B2 | 9/2014 | Sanguinet et al. |
| 8,955,242 B2 | 2/2015 | Bruce |
| 8,973,882 B2 | 3/2015 | Stangl et al. |
| 9,032,651 B2 | 5/2015 | Bruce |
| 9,061,797 B2 | 6/2015 | Goldburt |
| 9,089,221 B2 | 7/2015 | Stangl et al. |
| 9,161,644 B2 | 10/2015 | Williams |
| 9,192,241 B1 | 11/2015 | Seidl |
| 9,254,043 B1 | 2/2016 | Seidl |
| 9,428,207 B2 | 8/2016 | Hartenstine et al. |
| 9,532,654 B1 | 1/2017 | Adams, IV et al. |
| 9,585,486 B2 | 3/2017 | Seidl |
| 9,642,485 B2 | 5/2017 | Kuznicki, Jr. |
| 9,824,611 B2 | 11/2017 | Bruce |
| D804,394 S | 12/2017 | Bergin |
| D805,855 S | 12/2017 | Adams et al. |
| 9,848,691 B1 | 12/2017 | Pedersen |
| 9,867,471 B2 | 1/2018 | Seidl |
| 9,944,209 B1 | 4/2018 | Carnevali |
| 9,949,578 B2 | 4/2018 | Williams |
| D820,050 S | 6/2018 | Bergin |
| 10,019,917 B1 * | 7/2018 | Mezzera .................. G09F 7/18 |
| D826,658 S | 8/2018 | Bergin |
| 10,051,968 B2 | 8/2018 | Seidl |
| 10,083,638 B2 | 9/2018 | Lin |
| D837,002 S | 1/2019 | Nichols |
| D837,613 S | 1/2019 | Nichols |
| D837,614 S | 1/2019 | Nichols |
| D869,911 S | 12/2019 | Bergin |
| 10,621,850 B2 | 4/2020 | Laidlaw et al. |
| 10,772,435 B2 | 9/2020 | Bergin |
| 2002/0093228 A1 | 7/2002 | Forston |
| 2002/0179795 A1 | 12/2002 | Bergin |
| 2004/0118022 A1 | 6/2004 | Duesler |
| 2005/0080674 A1 * | 4/2005 | Howard ................ G06Q 30/02 705/14.14 |
| 2005/0201080 A1 * | 9/2005 | Seward .................. A47C 7/725 362/97.2 |
| 2008/0297997 A1 * | 12/2008 | Anderson .............. A63J 99/00 361/679.02 |
| 2009/0089841 A1 * | 4/2009 | Hanlon .................. B60R 11/02 725/75 |
| 2009/0249408 A1 * | 10/2009 | Smallhorn .......... B64D 11/0624 725/75 |
| 2010/0225654 A1 * | 9/2010 | Theis ................ G06Q 30/0241 345/520 |
| 2011/0029998 A1 * | 2/2011 | Yip ...................... H04N 21/812 725/14 |
| 2011/0109134 A1 * | 5/2011 | Filipour ................ A47C 7/723 297/217.4 |
| 2011/0139948 A1 | 6/2011 | Bergin |
| 2012/0212012 A1 * | 8/2012 | Berger ............. B64D 11/00151 297/163 |
| 2012/0314353 A1 | 12/2012 | Williams |
| 2013/0179201 A1 * | 7/2013 | Fuerstenberg ..... G06Q 30/0255 705/5 |
| 2013/0197981 A1 * | 8/2013 | Vendetti .................. H04W 4/33 705/14.5 |
| 2014/0124632 A1 | 5/2014 | Bouse et al. |
| 2016/0171913 A1 | 6/2016 | Sprinkle |
| 2016/0270561 A1 | 9/2016 | Williams |
| 2016/0297526 A1 * | 10/2016 | Everhart .............. H05K 5/0017 |
| 2017/0028874 A1 * | 2/2017 | Castaing .................. B60N 2/22 |
| 2017/0318974 A1 | 11/2017 | Bergin |
| 2017/0330263 A1 * | 11/2017 | Shaffer ............. G06Q 20/3274 |
| 2019/0014935 A1 | 1/2019 | Bergin |
| 2019/0034976 A1 * | 1/2019 | Hamedi ............. G06Q 30/0204 |
| 2019/0082852 A1 * | 3/2019 | Guschmer .............. A47C 7/506 |
| 2020/0205574 A1 | 7/2020 | Fiden |
| 2021/0174344 A1 * | 6/2021 | Fowler ................ G06K 7/1417 |

OTHER PUBLICATIONS

Examiner Interview Summary for U.S. Appl. No. 11/854,328, U.S. Patent and Trademark Office, dated Sep. 23, 2009, 2 pages.

International Preliminary Report on Patentability for PCT International Appl No. PCT/US2008/076276 performed by the the International Bureau of WIPO, dated Mar. 16, 2010, 4 pages, Geneva, Switzeriand.

International Search Report for PCT International Appl No. PCT/US2008/076276 performed by the Korean Intellectual Property Office, dated May 15, 2009, 4 pages, Daejeon, Republic of Korea.

Written Opinion of the International Searching Authority for PCT International Appl No. PCT/US2008/076276 performed by the Korean Intellectual Property Office, dated May 15, 2009, 6 pages, Daejeon, Republic of Korea.

Response to Office Action for U.S. Appl. No. 11/854,328, submitted to the U.S. Patent and Trademark Office dated Jul. 13, 2009, 19 pages.

(56) References Cited

OTHER PUBLICATIONS

Notice of Allowance for U.S. Appl. No. 11/854,328, U.S Patent and Trademark Office, dated Dec. 3, 2009, 21 pages, Alexandria, Virginia.
Office Action for U.S. Appl. No. 11/854,328, U.S Patent and Trademark Office, dated Sep. 2, 2009, 17 pages, Alexandria, VA.
Response to Office Action for U.S. Appl. No. 11/854,328, submitted to the U.S. Patent and Trademark Office dated Sep. 16, 2009, 10 pages.
Office Action for U.S. Appl. No. 11/854,328, U.S. Patent and Trademark Office, dated Jul. 20, 2009, 3 pages, Alexandria, VA.
Office Action for U.S. Appl. No. 11/854,328, U.S. Patent and Trademark Office, dated May 13, 2009, 18 pages, Alexandira, VA.
Office Action for U.S. Appl. No. 11/854,328, U.S. Patent and Trademark Office, dated Nov. 13, 2008, 18 pages, Alexandria, VA.
Response to Office Action for U.S. Appl. No. 11/854,328, submitted to the U.S. Patent and Trademark Office dated Aug. 13, 2009, 26 pages.
Post Allowance Communication for U.S. Appl. No. 11/854,328, submitted to the U.S. Patent and Trademark Office dated Feb. 4, 2010, 8 pages.
Response to Office Action for U.S. Appl. No. 11/854,328, submitted to the U.S. Patent and Trademark Office dated Feb. 13, 2009, 15 pages.

\* cited by examiner

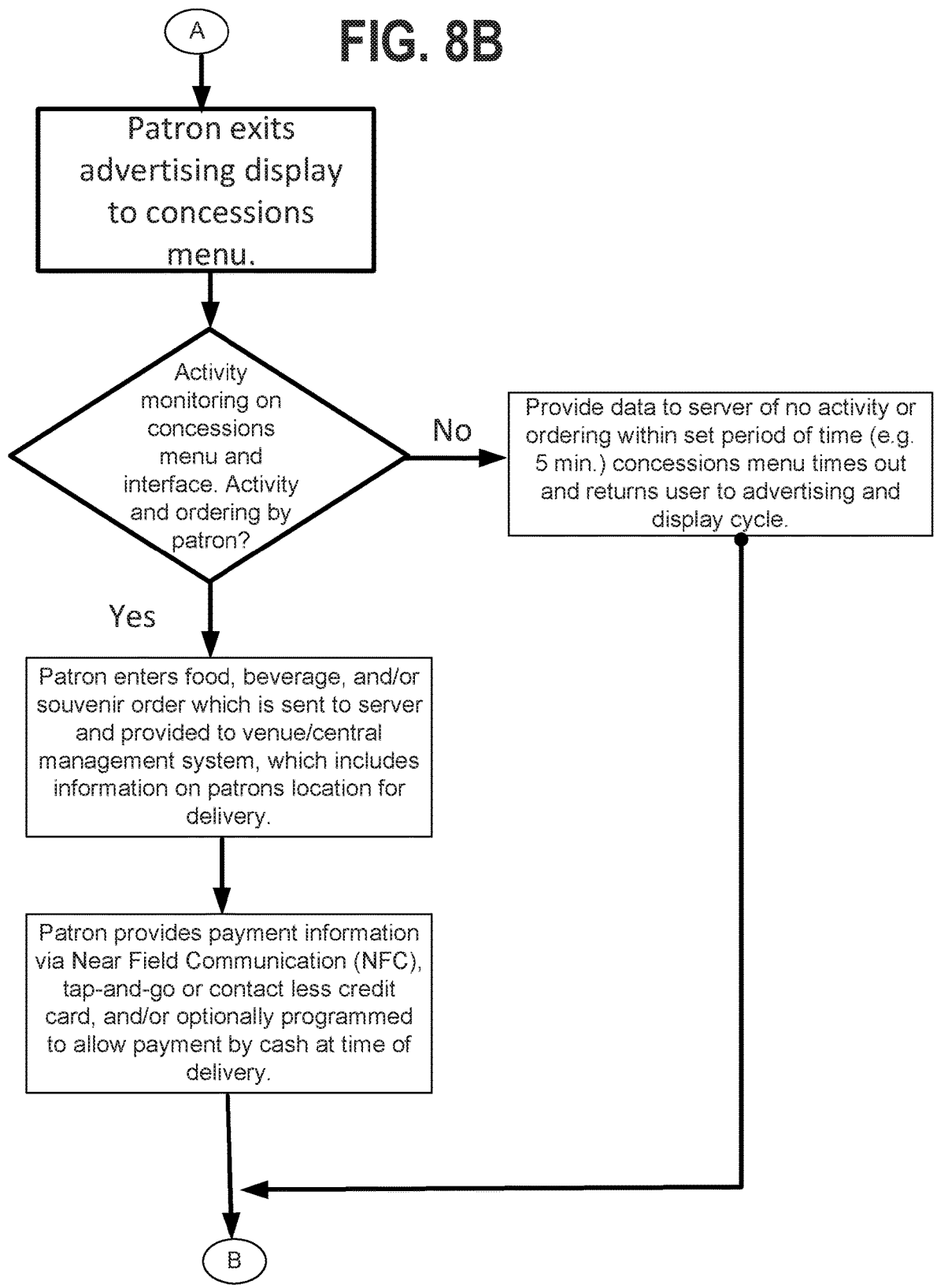

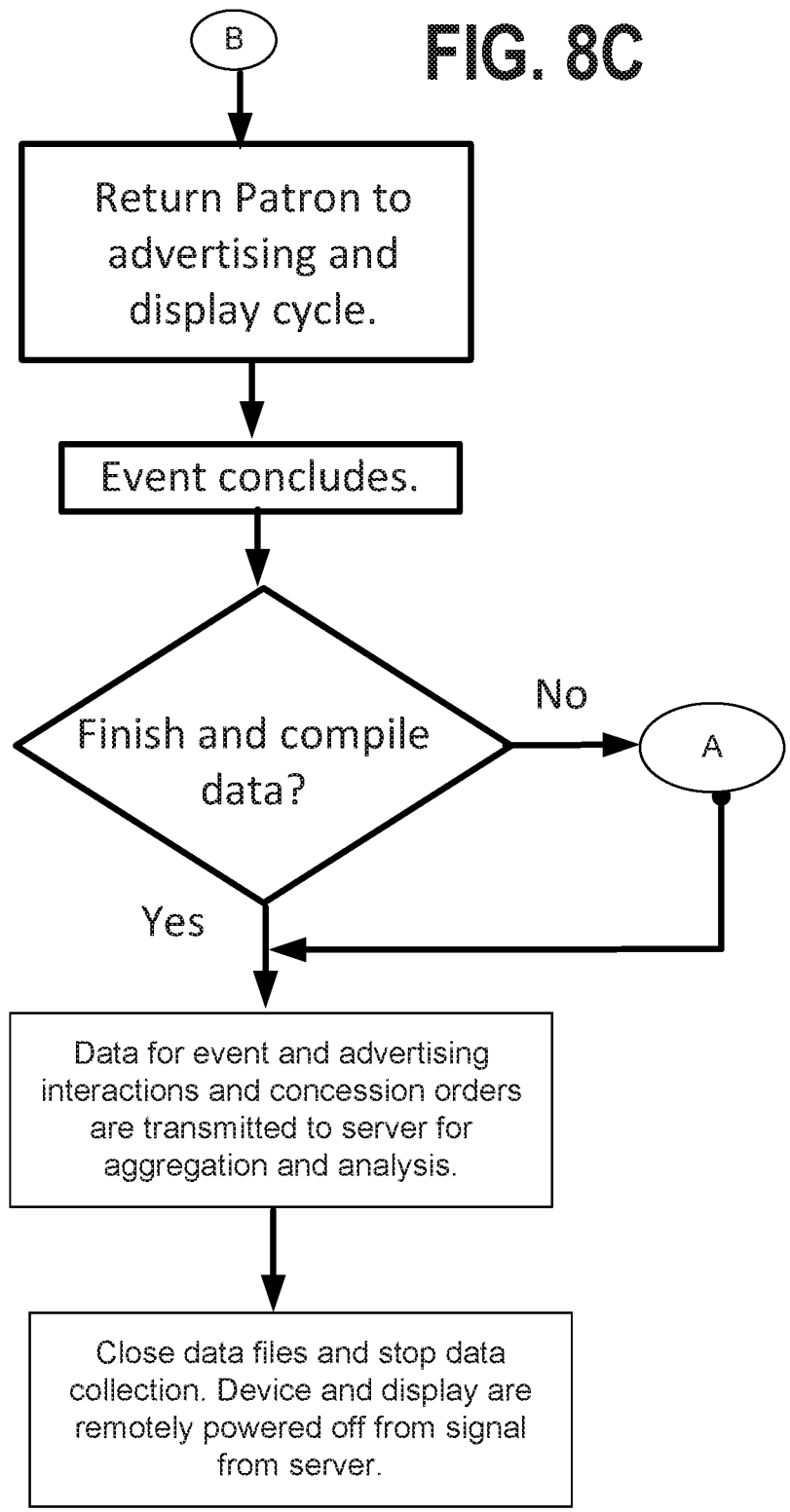

INFORMATIVE APPARATUS AND METHOD

BACKGROUND

The activities of marketing and advertising are important parts of the economy. Effective marketing and advertising introduce and promote products, opportunities or services that otherwise would not be known to the consuming public. The consumer would typically desire information about a product or service before the consumer would consider purchasing that product or service. Marketing and advertising provide this information to the consumer to thereby inform the consumer about the existence of the product or service and its various attributes.

Public venue advertising is ubiquitous. As a means to inform the user and/or promote specific products and generate additional revenue, such venues often will sell space to advertisers. The advertising can be displayed in many ways, such as on billboards, on walls, on electronic displays, on printed material, and other ways. However, because of the often remote (e.g., billboards) or transient (e.g., napkins) nature of these existing types of advertisements, they may fail to adequately grab the consumer's attention, or capture the consumer's eye in a manner that would leave the desired lasting impression. Thus, there appears to be an open niche for alternative advertising methods to accommodate the valuable commercial resource of the immediate visual area directly in front of the consumer in a captive-audience venue.

Seating structures such as seatbacks and seat bottoms are frequently found in public and private venues where seating is common and these seating structures may be utilized to provide multiple functions such as hold beverages, food, sundries, or other personal effects while also providing a space to store electronic components that may be used to advertise on, such as cupholders, seatbacks, seat bottoms, or other dedicated digital displays. Seating structures are generally positioned so as to be conveniently accessible to the patrons sitting in the seats provided. For example, a typical seating structure such as a cupholder may be in position in front of the patron or in front of the patron's drinking arm, so that the patron can place their drink in the cupholder when not drinking, and reach their drink easily when desired. Cupholders may be mounted or affixed to the seat backs of the row in front of a patron, so that they are readily accessible to the patron while at the same time not interfering with the comfort, view, or other sensory faculties of others in the public venue.

SUMMARY

The present disclosure relates to an informative/advertising apparatuses and/or methods which in some implementations may be or may include a seat structure or other seat supported apparatus, either as a base unit or as a retrofit apparatus, and in some examples may include a seat, a seat back, an armrest, a cupholder, a cupholder attachment apparatus, a portable device or mobile device attachment apparatus, a pole holder, or other storage or holding apparatus, either having one or more replaceable devices attachable thereto, as in some examples including an insert or inserts, also referred to herein in some examples, as appurtenant panels and/or emblems. In many instances, either of the devices, whether panels or emblems could be used for advertising purposes, which may be adapted to be manufactured as parts of or otherwise may be installed on existing seats, either as or attachable to or apart from seats, seatbacks, arm rests, cupholders, portable or mobile device attachment apparatuses, pole holders or other storage or holding apparatuses for improved exposure to the target audience of the advertising.

The present developments disclosed herein may also include a seat structure or other seat supported apparatus, either as a base unit or a retrofit apparatus, wherein the seat structure or seating apparatus may provide the structure and housing for electronics necessary to power and control an electronic display that is disposed on an adjustable modular bracket system that may be attached to a seat, a seat back, arm rest, a cupholder, a cupholder attachment apparatus, a portable or mobile device attachment apparatus, which may be accessible, visible, and/or useable by a patron at a public venue.

In some implementations of an advertising apparatus hereof, such may be attached or removed without the use of any special tools. In other implementations, the apparatus may be desirably set as difficult to remove; one or more special tools may be adapted for mounting and/or removal. Such special tools and/or a special method for installing and/or removing such apparatuses and/or the emblems and/or other appurtenant display panels or other such devices may be implemented to avert vandalism as by undesirable removal of the apparatus, emblem or appurtenant device.

The developments disclosed herein further relate to the use of electronically enabled digital technology to facilitate the information/advertisements placed on displays disposed in the seating envelope. The term seating envelope refers generally to the immediate area that a patron or consumer occupies or is seated in during an event at a captive-audience venue. The seating envelope may include the seat support structure, the seat back, the seat bottom, one or more seat stanchions, bleachers, risers, armrests, cupholders, mounting brackets, mountable holder assemblies for beverage and food holding, concession trays, container holders, and other structures that may be adapted to increase the comfort, functionality, usability, and enjoyability of the public venue and the seating areas disposed therein. The seating envelope at most public venues is limited by space available to add additional items due to the desire to provide high density seating in a confined space. Therefore, the developments hereof disclose structure and housing for an accessible cavity for storage of technology and electronics within the seat support structure, arm rest, seat back, bottom of a seat, and in some implementations within an adjustable modular mounting bracket. These accessible cavities provide several locations to place and store the necessary single board computer, display(s), battery, Near Field Communication (NFC) technology and radio-frequency identification (RFID) technology (more generally contactless payment systems), speaker, interactive buttons, motion sensor, occupancy sensor, charging ports, photo cells, Bluetooth, Low-Energy Bluetooth (LEBT), WiFi access points, memory card and other electronically connected and enabled apparatuses used to facilitate and enable the advertising devices.

In some implementations hereof, the advertising apparatus comprises, an electronically enabled display which may be black and white, grayscale, one color, multi color, or full color, and may include an LCD (liquid crystal display), LED (light emitting diode), OLED (organic light emitting diode), AMOLED (active-matrix organic light-emitting diode), plasma or PDP (plasma display panel), an e-ink display, or an e-paper display. In some implementations there may be one, two, three, or more electronic and static displays connected to or incorporated with the advertising apparatus. In some implementations of the developments hereof, a main display panel may be a different type of display than other panels that are disposed in the seating envelope. For instance, in implementations that have more than one electronic display, a main display may be in color and provide for video and interactive functionality with the patron via a touch screen while other displays such as those disposed in a cupholder, seat back, arm rest or other structures may be an e-ink or e-paper display. In some implementations, the display is curved or flexible such that it can be fit to the external structure of a smooth-curved apparatus or wrap-around type of display such as an appurtenant panel or face of a cupholder, as described in more detail below. These devices may be "daisy-chained" together and share a common power supply and/or battery, computer, data signal, wireless and/or WiFi signal, and data content. In some instances, a single board computer may govern and/or control an array of electronic digital displays for each section, or each row. In some instances, this single board computer may link all of the displays together and in this fashion may save power, simplify the management of the system, and may save money by reducing the hardware and electronics needed for the system. Yet, in other implementations a stand-alone apparatus may have an e-paper or electronic display and may be configured to not need to be connected to a remote server, nor would the display accept or require any input from a patron.

The informational/advertising devices, including static and motion displays, whether as electronic displays, inserts, appurtenant panels and/or emblems may be pre-attached to the advertising apparatus before installation on an existing support structure to be installed in the seating envelope, or may be attached after the support structure has been installed in the venue. Alternatively described, the advertising devices may be fully integrated and planned for when developing the seating layout, plans, and structures for a new public venue that is to be constructed, and in other instances the advertising devices hereof may be retrofitted and installed after the venue has been constructed and substantial or all elements of the seating envelope have been chosen.

When usable with a cupholder, the cupholder functionality would still be accessible to a patron after the advertising apparatus has been mounted in place. Once the appurtenant panel and/or emblem has been installed, or if it has been preinstalled, it would preferably be visible to a patron who would be using that cupholder and in many cases may also be viewable by other patrons of the establishment. The appurtenant panel, whether printed or digital, and/or emblem may carry advertising material to thus add value in informing the patron or patrons of sponsorship or goods or services available to them. The advertising device; e.g., the appurtenant panel and/or the emblem may be removable, replaceable and/or interchangeable with other such panels or emblems carrying different advertising indicia, so that advertising messages may be readily changed upon proprietor desire.

Different versions of advertising apparatus may be installed on the same type or style of seatback, arm rest, cupholder or other support structure; conversely, the same advertising apparatus may be adapted to be installed on a variety of seats, cupholders or other support structures. Installation and placement may depend on a variety of factors, including the position of the patron, the position of the seat, the type of seat, the flow of traffic around the seat, or the cost or pricing assigned by the management of the venue. The advertising apparatus may be made of an easily moldable material, and the appurtenant panel may also be made of an easily moldable material or often alternatively of a die cut resilient material, so that both advertising apparatus and appurtenant panel may be made in a variety of colors, and adapted to bear whatever advertising is desired. Similarly, an emblem member may be employed of the same or different materials and/or colors and may carry one or more alternative emblems for purposes to be described hereinbelow.

Disclosed herein is at least an adjustable modular mounting bracket which is capable of being attached to a seat, seat back, or seat support structure. In some implementations, the adjustable modular mounting bracket has an angle built into the structure prior to mounting. In other implementations, the adjustable modular mounting bracket does not have an angle built-in to the structure, but nonetheless can have its cant or tilt adjusted after being secured to a structure, or after mounting.

Disclosed herein also is digital display advertising apparatus that may be attached to a modular mounting bracket which is capable of being attached to a seat, seat back, arm rest, seat support structure. In some implementations, the advertising apparatus may have one, two, three, four, or more, spaces for digital and/or printed advertisements. In some implementations, the digital advertisements require interaction from the patron or user which may provide access to a QR code or access code for purposes of special promotions, tracking, funneling, awareness, interest, desire, or action, and other aspects of a print or digital advertising campaign, or known to those workers skilled in the art.

These and still further aspects as shall hereinafter appear are readily fulfilled by the present developments in one or more remarkable and/or unexpected manners as will be readily discerned from the following detailed description of exemplary implementations thereof especially when read in conjunction with the accompanying drawings in which like parts bear like numerals throughout the several views.

DETAILED DESCRIPTION

The developments hereof relate to a variety of technology enabled advertising apparatuses, storage compartments, cavities, chambers, and spaces for use with said technology enabled advertising apparatuses, and digital and printed displays typically configured to display advertising on or adjacent an external surface highly visible to consumers. In many implementations, the advertising apparatus is adapted to be attached to a support structure, typically, a support surface which may be found in a captive-audience venue. Such a support surface may in some instances be or may be on or otherwise associated with patron seats or seating structures, as for example on seat backs or arm rests. In a further variety of examples, the advertising apparatus may alternatively be a free-standing apparatus. Some advertising apparatuses hereof may entertain no other functionality, other than providing an advertising surface; whereas, other apparatuses may have built-in alternative functionalities, such as seats or seatbacks or providing containers or supports for patron/consumer items such as drink cups, reading or writing material, programs, writing utensils or other items. In some implementations, the advertising apparatus may be integral with or otherwise attachable to previously installed consumer item-holding apparatuses acting as the support structure, as for example being an integral cupholder/advertising apparatus or being adapted to be coupled to one or more of a variety of pre-existing or to-be-developed cupholders. Such apparatuses may be disposed in stadiums, arenas, theatres, or other public or private venues for view by the patrons thereof.

Figure 1:
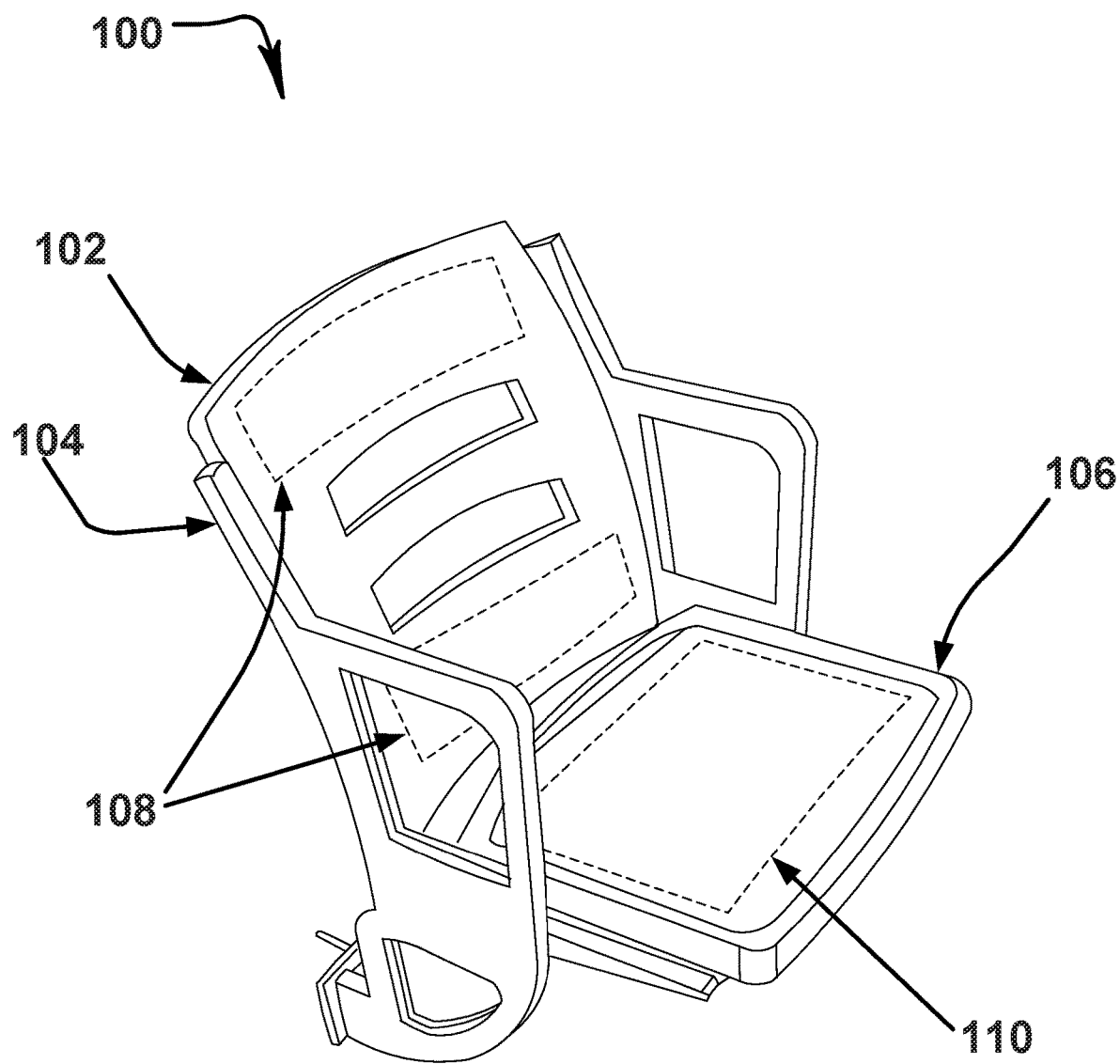
FIG. 1 provides an isometric view of a seat support structure, back of seat, and bottom of seat that provides the structure and housing for an accessible cavity for storage of technology and electronics within a back and bottom of a seat.

FIG. 1 provides an isometric view of a seat support structure, back of seat, and bottom of seat that provides the structure and housing for an accessible cavity for storage of technology and electronics within a back and bottom of a seat. The seating envelope 100 may be comprised of a seat back 102, a seat support structure 104, and a seat bottom 106, and other elements such as one or more seat stanchions, bleachers, risers, armrests, cupholders, mounting brackets, mountable holder assemblies for beverage and food holding, concession trays, container holders, advertisement displays, and other elements that are not shown or described in this FIG. 1. In one implementation of an advertising apparatus disclosed herein, accessible seatback cavities for technology storage 108 may be disposed in the seat back. Moreover, accessible seat bottom cavities for technology storage 110 may disposed in the seat bottom. These accessible cavities are weather and vandal resistant and may require special tools or tooling to access the interior cavities where the technology may be housed and stored. In some implementations these cavities may allow for air circulation in certain manners which allows for cooling of the single board computer, processor, and battery which may generate heat during operation. In other implementations, the technology and electronics have been designed in such a manner that little or no external air flow is needed to allow for proper operation of the technology and electronics disposed in the seatback cavity for storage 108 and seat bottom cavity for storage 110.

Figure 2:
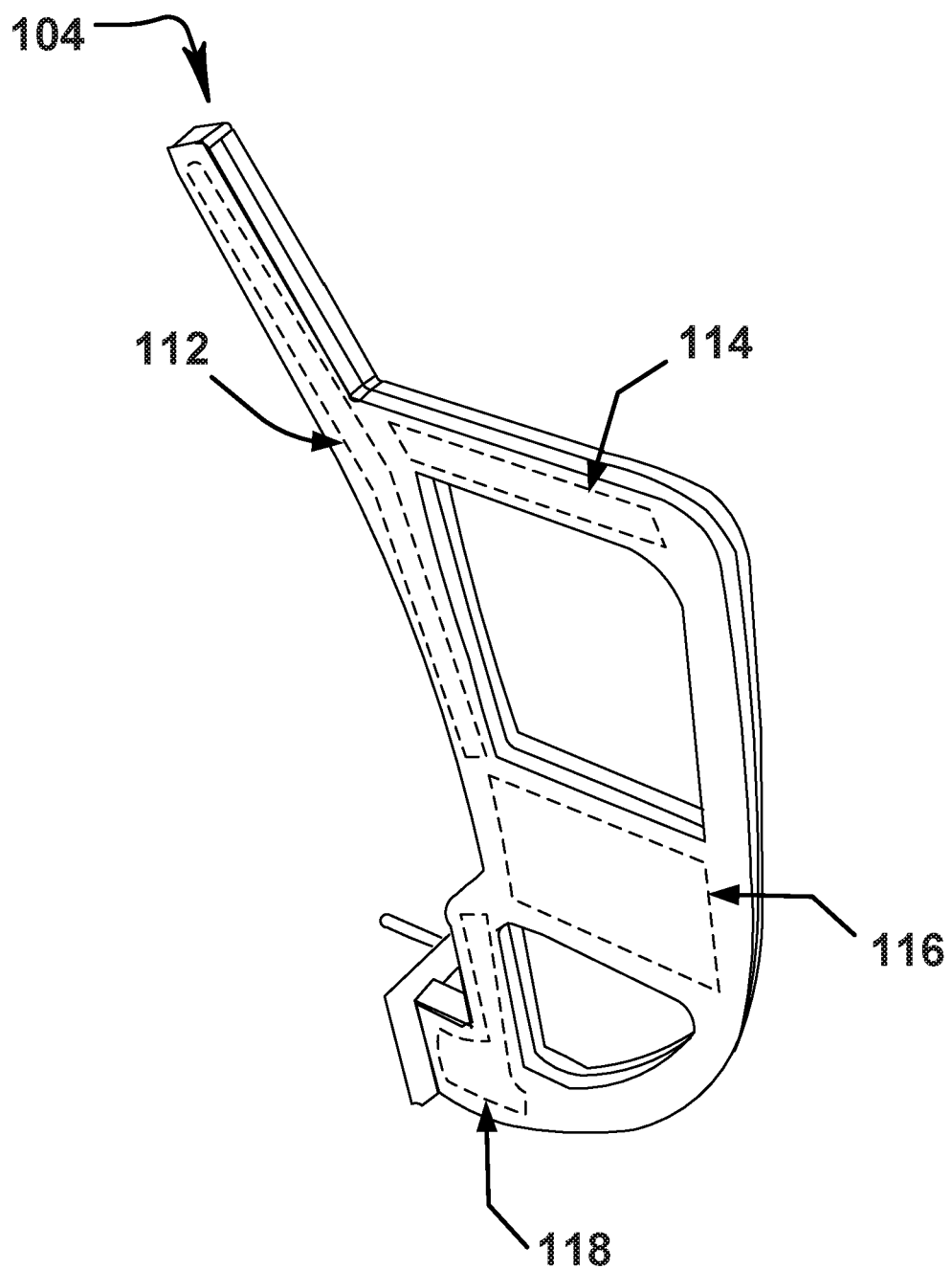
FIG. 2 provides an isometric view of a seat support structure that provides the structure and housing for an accessible cavity for storage of technology and electronics within the seat support structure.

FIG. 2 is an isometric view of a seat support structure 104 that provides the structure and housing for an accessible cavity for storage of technology and electronics within the seat support structure. In one implementation of the developments disclosed herein, the seat support structure provides additional storage cavities for technology and electronics as shown in 112, 114, 116, and 118. The seat support structure may provide for storage inside the back of the seat support as in 112, inside the arm rail or arm rest as in 114, inside the side support 116, or inside the bottom anchor or support region of the seat support as in 118. These accessible cavities are weather and vandal resistant and may require special tools or tooling to access the interior cavities where the technology may be housed and stored. In some implementations these cavities may allow for air circulation in certain manners which allows for cooling of the single board computer, processor, and battery which may generate heat during operation. In other implementations, the technology and electronics have been designed in such a manner that little or no external air flow is needed to allow for proper operation of the technology and electronics disposed in the technology storage cavities of 112, 114, 116, and 118. It should be appreciated that the seat storage cavities, chambers, and compartments hereof may be molded-in during the initial fabrication process for different parts included in the seating envelope, or in other instances these storage cavities, chambers, and compartments may be fabricated separately and attached to structures such as the seat back, seat bottom, or seat supports.

Figure 3:
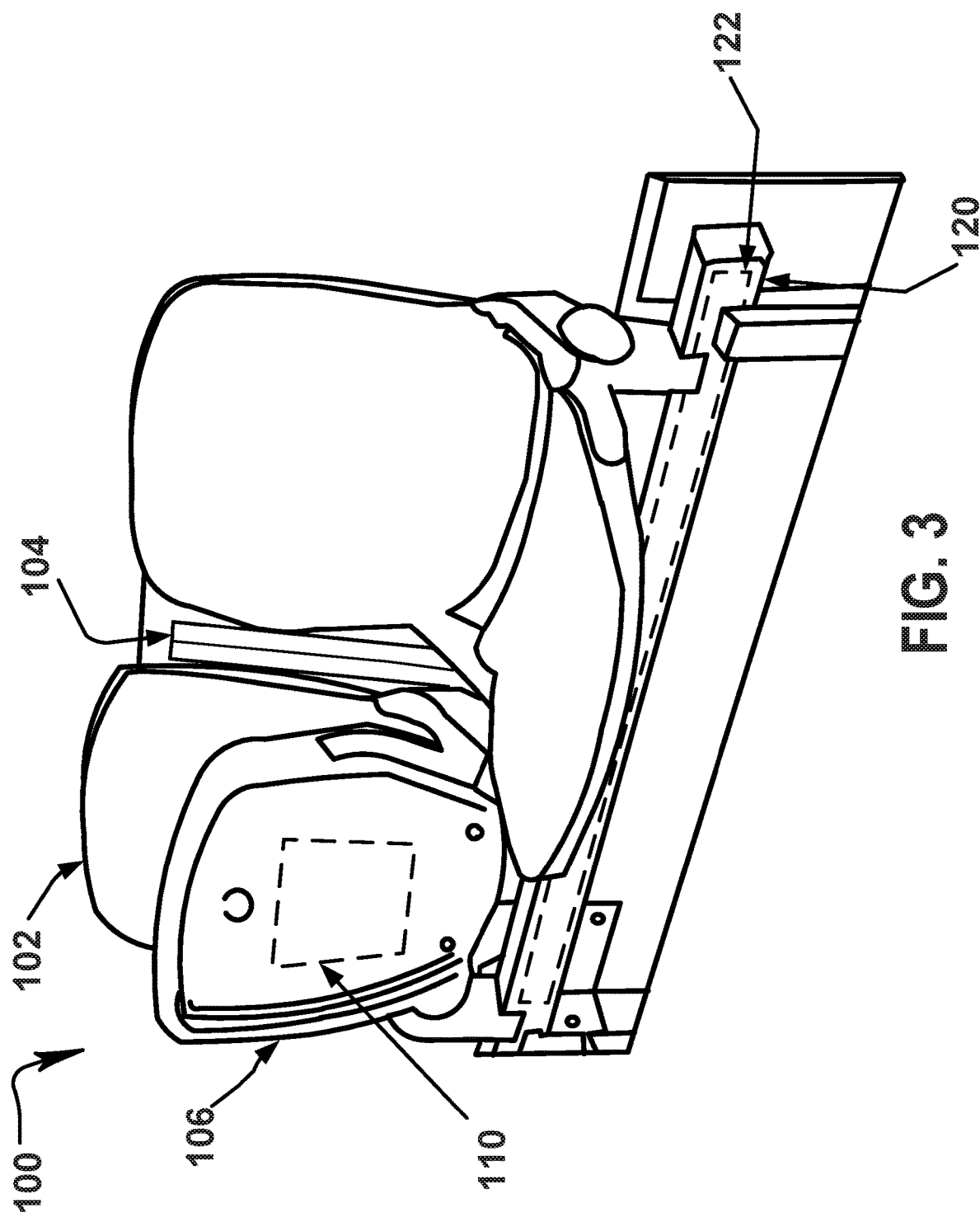
FIG. 3 provides an isometric view of an implementation of the developments hereof with beam mounted seats.

FIG. 3 provides an isometric view of an implementation of the developments hereof with beam mounted seats. Here, the seating envelope 100 may be made up of or from a seat back 102, a seat support structure 104, and a seat bottom 106. Other elements of the seating envelope such as one or more seat stanchions, bleachers, risers, armrests, cupholders, mounting brackets, mountable holder assemblies for beverage and food holding, concession trays, advertisement displays, and others are not shown or described in this FIG. 3. Accessible seat bottom cavities for technology storage 110 may disposed in the seat bottom. Moreover, the seat support structure may vary between venues and in some instances seats may be mounted to a beam 120. When beam seating is used by the venue, storage for technology and electronics may be placed inside the beam storage compartment 122.

Figure 4:
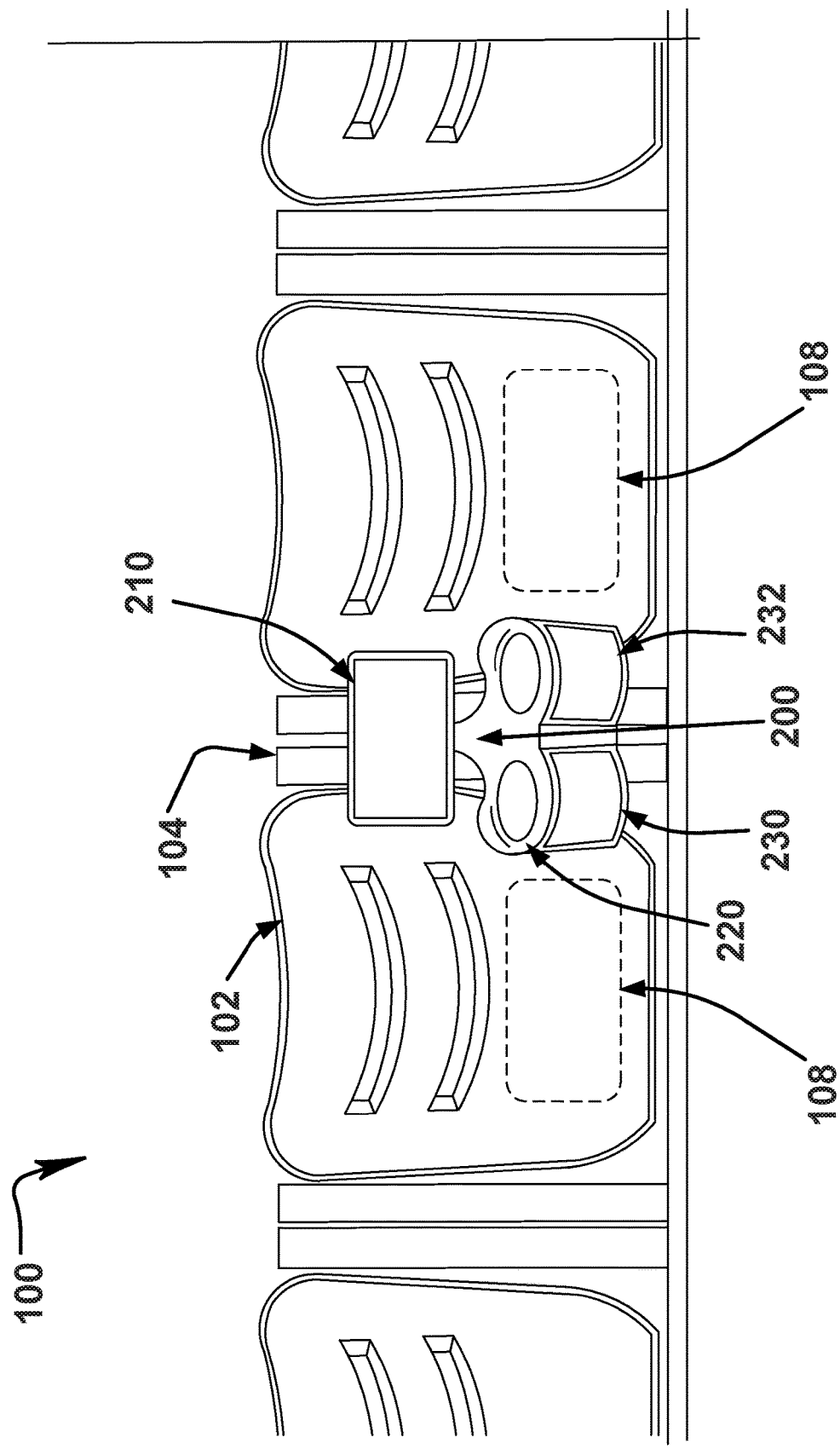
FIG. 4 provides an isometric view of an implementation of the developments hereof.

FIG. 4 provides an isometric view of an alternative implementation of the seating envelope 100 developments hereof, including a back of seat 102; a seat support structure 104; back of seat technology storage compartment 108 that is adapted to be connected to, integrated with, and/or disposed in the back of a seat 102; a body portion 200 which is connected to and/or disposed on a seat support structure 104; an electronic digital display 210 adapted to be connected to and/or disposed on the body portion 200, or on a seat support structure 104; a cupholder attachment apparatus 220 which is connected to and/or disposed on the body portion 200, or directly connected to or disposed on the seat structure 104; and, appurtenant panels 230 and 232 which are updateable and/or replaceable advertising devices, which may readily adapted for display of advertising material (not shown here, though it could be a variety of types, including e.g., adhesives material stuck on panels 230 and 232, or could be reverse printed or imaged on the back side of a clear material to deter scratching or vandalism to the image, or could be removable, or could be integrally formed thereon, or as a part thereof). In FIG. 4, the electronic digital display 210, may be black and white, grayscale, partial color, or full color, and may include an LCD (liquid crystal display), LED (light emitting diode), OLED (organic light emitting diode), AMOLED (active-matrix organic light-emitting diode), plasma, or PDP (plasma display panel), an e-ink display, or an e-paper display.

Further, the electronic digital display 210 of FIG. 4, may provide for video advertisements and/or interactive functionality with the patron via a touch screen and may display advertisements of images and videos. In some implementations, the display may be connected to external sensors (photo-sensors) that determine the ambient brightness of the location in the venue and may automatically adjust the brightness of the display, or alternatively automatically dim the display for easier visibility and use by the patron. In the instance that the digital display 210 is used at outdoor venues with variable weather, an enclosure for the display may necessarily be constructed and designed in a more robust fashion to be weather and water resistant, and thus allow the digital display to operate and function in extremely cold and wet environments, or alternatively be able to operate and function in the extremes of hot and humid environments. The digital display 210 may be communicatively operative and controlled by with a compact single board computer (not included in FIG. 4) including in some implementations an open source computer such as a Raspberry Pi, Arduino, Orange Pi, or custom single board computer that may include one or more of the following: on board processing, storage, indicator light, micro SD slot, memory card slot, flash memory, WiFi, ethernet, USB, power supply, RAM, individually MAC addressable, and multi-pin connection points. The electronic digital display 210 may offer the patron the opportunity to interact with pre-programmed advertisements, purchase concessions, souvenirs, and future tickets, and may allow the patron to purchase access to watch an event, such as a sporting event that is occurring concurrently with the event that the patron is attending.

Additionally, optional appurtenant panels 230 and 232 are shown in FIG. 4, which in some implementations themselves be an electronic digital display or alternatively may be snap-in printed advertising material. Appurtenant panels 230 and 232 may be used with any of the implementations hereof. In some implementations, only one appurtenant panel may be disposed and connected to a surface suitable for mounting whether that be a front face of a cupholder, or another position suitable to hold and display the panel. A potential advantage of an appurtenant panels 230, 232 may be that it could be relatively easily removable (though perhaps preferably with a particular tool to avert undesirable, vandalistic removal) and replaceable with an alternative panel (not shown), differing primarily (if perhaps solely) in the indicia displayed on or as a part of the panels 230, 232. Fast and efficient removal, installation and/or replacement may thus be achievable. Note, though stickers such as those often used previously may also be used here, many typical implementations would not use stickers and use instead interchangeable, replaceable panels 230, 232 which each have discrete presentations screen printed directly thereonto or molded directly thereinto, the discrete presentations often being of different branding or sponsorship, venue or team affiliation or the like. Moreover, the front face of the panels 230, 232 may be of different shapes, sizes. The front face or other part of the device may include alternative messaging types, as for example, display or broadcast or transmission of informational and/or advertising material of electronic or electromagnetic presentations such as light emitting diode (LED) presentations, or other electronic presentation forms providing visual or aural (or other sensory) signals (as for example, liquid crystal display (LCD), plasma or other presentation forms), or Bluetooth®, or the like, or i-beacon, or Bluetooth Low Energy (BLE) or another low-power or lower frequency version of Bluetooth, such presentations perhaps providing scrolling, static, flashing, random and/or updateable custom messaging, such messaging alternatively being re-programmable on particular panels 230, 232 or being set such that alternative messaging is provided by replacing the LED or other electronic presentation panels 230, 232. Re-programmability might include an ability to broadcast or nearcast a re-programming signal to one or more electronic presentation panels 230, 232 simultaneously or serially. Radio Frequency (RF) signals and RF Identification (RFID) may be useable herefor. Presentations aurally could be sent via one or more advertising apparatuses to an individual patron via the airspace between the patron and the advertising device, or to listening device such as a headset or an earbud. The listening device could be radio frequency enabled to receive radio frequency signals from the advertising apparatus, such as being an AM or FM or like radio device. Any of these could be used for general advertising, general announcements, play-by-play announcements along or alternatively involving provision of player statistics, or the like or venue advertisements.

Figure 5:
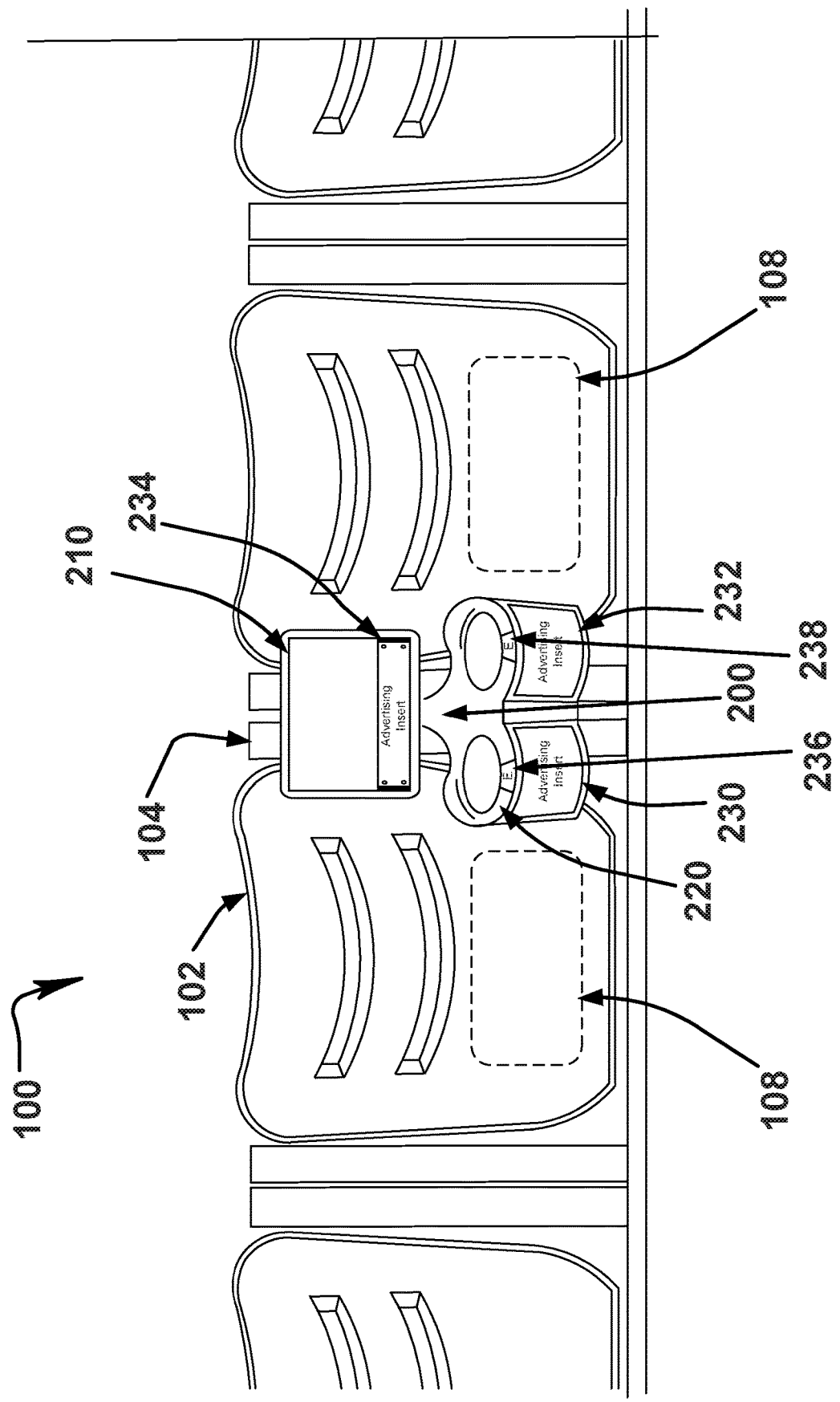
FIG. 5 provides an isometric view of an implementation of the developments hereof.

FIG. 5 provides an isometric view of an alternative implementation of the seating envelope 100 developments hereof, including a back of seat 102; a seat support structure 104; back of seat technology storage compartment 108 that is adapted to be connected to, integrated with, and/or disposed in the back of a seat 102; a body portion 200 which is connected to and/or disposed on a seat support structure 104; an electronic digital display 210 adapted to be connected to and/or disposed on the body portion 200, or on a seat support structure 104; a cupholder attachment apparatus 220 which is connected to and/or disposed on the body portion 200, or directly connected to or disposed on the seat structure 104; appurtenant panels 230, 232 and 234 which are updateable and/or replaceable advertising devices, which may readily adapted for display of advertising material (not shown here, though it could be a variety of types, including e.g., adhesives material stuck on panels 230, 232, and 234, or could be reverse printed or imaged on the back side of a clear material to deter scratching or vandalism to the image, or could be removable, or could be integrally formed thereon, or as a part thereof; and emblems 236 and 238 which may be removable, replaceable, advertising devices or vehicles, which may be made in two or more of a variety of forms, or with a variety of messages, or logo, or website addresses, or having other information to be attached to and become a detachable or replaceable part of an advertising apparatus. Thus, it may be that emblem members may be made relatively interchangeable, coming in different colors and/or with one or more of a variety of logos or emblems (e.g., of different sporting teams, or sponsors) so that each advertising apparatus may be relatively customized for a different team or stadium or event or the like. Messages may thus be changed at a proprietor's desire. Note, though stickers such as those often used previously may also be used here, many typical implementations would not use stickers and use instead interchangeable, replaceable emblem members 236, 238 which each have discrete presentations screen printed directly thereonto or molded directly thereinto, the discrete presentations often being of different branding or sponsorship or team affiliation or the like. Also and/or alternatively, the front or top face of the emblem 236, 238 may be of different shapes, sizes and/or may include alternative messaging types, as for example, light emitting diode (LED) presentations, such presentations perhaps providing scrolling, static, flashing, random and/or updateable custom messaging, such messaging alternatively being re-programmable on particular emblems 236, 238 or being set such that alternative messaging is provided by replacing LED emblems 236, 238. Furthermore, as before, in at least some implementations, special tools and/or methods may be employed to install and remove such emblems to avert vandalism. Also, it may be that such devices may be adapted to be easily, quickly and/or efficiently removable, installable and/or replaceable.

Figure 6:
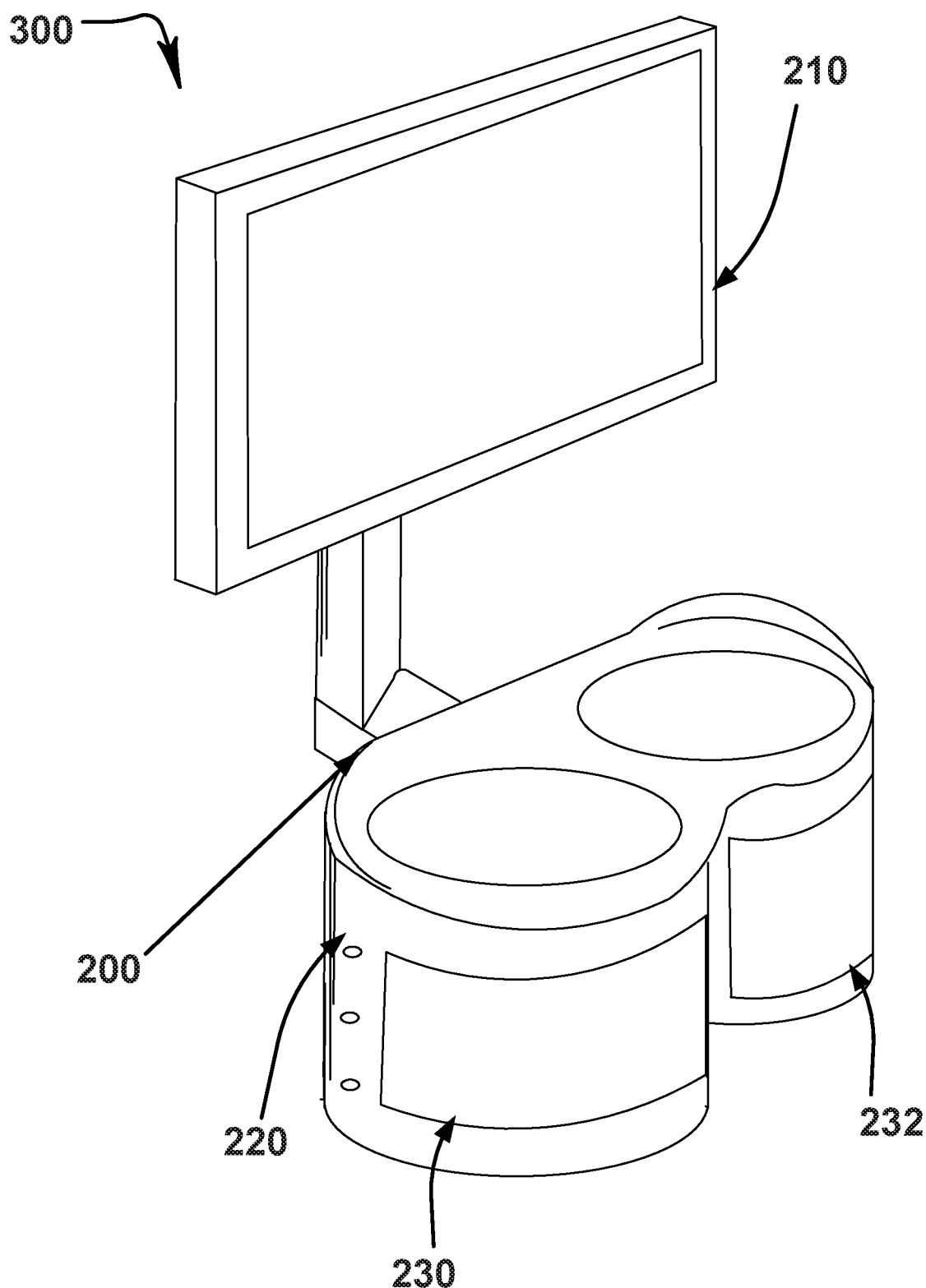
FIG. 6 provides an isometric view of an implementation of the developments hereof.

FIG. 6 provides an isometric view of an integrated advertising console 300, including a body portion 200 which is connected to and/or disposed on a seat support structure (not shown in this FIG. 6); an electronic digital display 210 adapted to be connected to and/or disposed on the body portion 200, or on a seat support structure (not shown in this FIG. 6); a cupholder attachment apparatus 220 which is connected to and/or disposed on the body portion 200, or directly connected to or disposed on the seat structure (not shown in this FIG. 6); and, appurtenant panels 230 and 232 which are updateable and/or replaceable advertising devices, which may readily adapted for display of advertising material (not shown here, though it could be a variety of types, including e.g., adhesives material stuck on panels 230 and 232, or could be reverse printed or imaged on the back side of a clear material to deter scratching or vandalism to the image, or could be removable, or could be integrally formed thereon, or as a part thereof).

Figure 7:
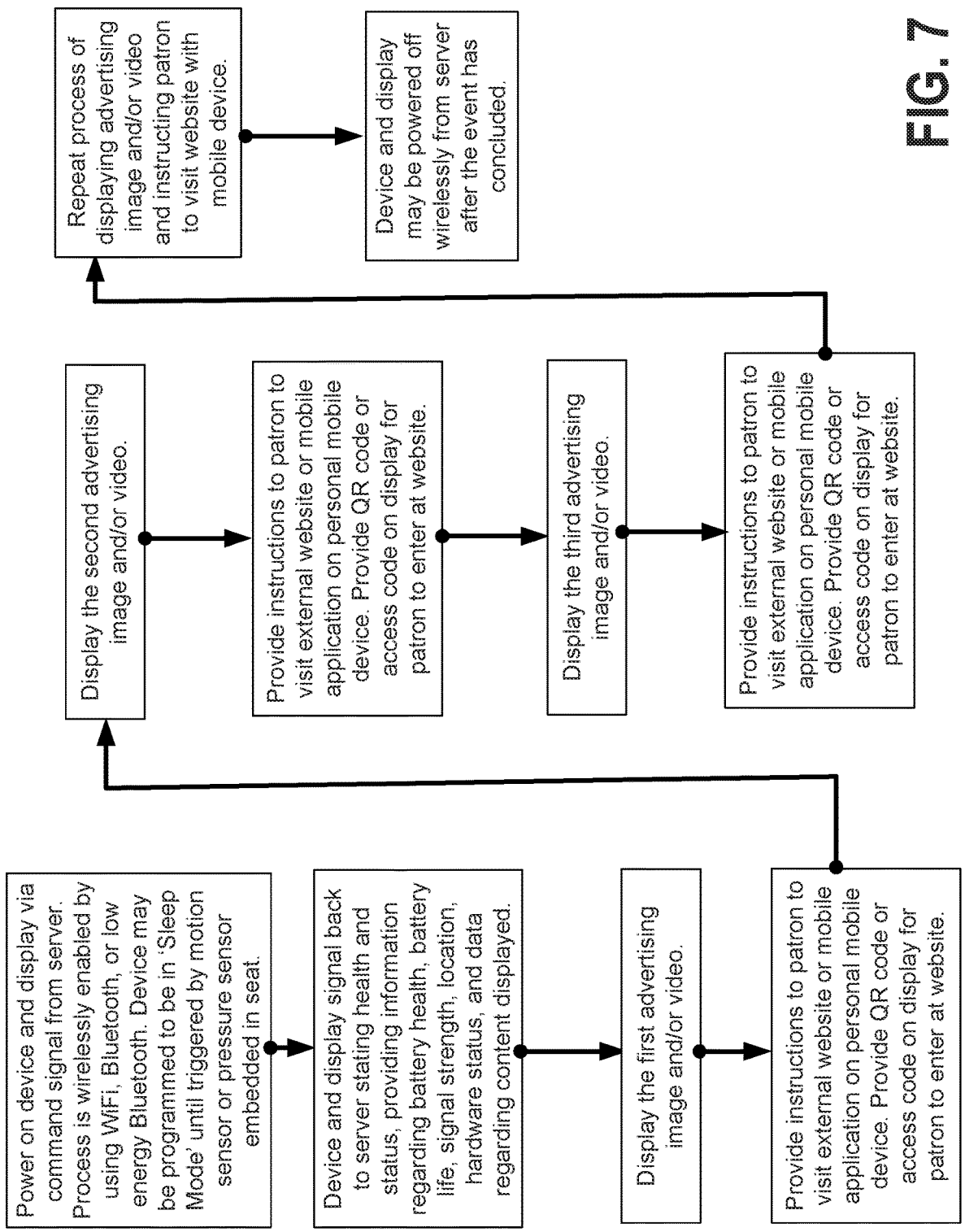
FIG. 7 provides a methodology for operating the advertising display apparatus disclosed herein.

FIG. 7 provides an optional method for controlling and operating the single board computers and electronic digital displays 210. First, the computer and display are powered on via a command signal sent from a server. In some instances, this server is a remote server and in other instances the server is located and operated at the venue. The process for powering on the devices is wired or wirelessly enabled by using 3G, 4G or 5G wireless communication technology, WiFi (801.x type standard), Bluetooth®, or Low Energy Bluetooth (LEBT). The control device in some instances may be powered on but allowed to conserve energy by remaining in 'Sleep Mode' or other resting state until triggered by motion sensors operably connected to the electronic digital display 210, or occupancy sensors embedded in the seat bottom 106. After being powered on, the device and electronic digital display 210 signal back to the server stating the health and status of the device and display 210, including but not limited to information regarding battery health, battery life, signal strength, location, hardware status, and data regarding content displayed. Next, the device and display may display the first advertising image or video chosen by and sent from the server. The advertising image or video may be pre-selected by a user or randomly chosen from a list of advertisements and videos. At the end of the advertisement, instructions may be provided to the patron to visit an external website or mobile application on the patron's personal mobile device. A QR code or access code may be displayed on the electronic digital display 210, for the patron to enter at a website or application, of the sponsor or advertiser. In one aspect, the QR code or access code may allow the customer to receive a discount, access special offers, or allow the advertiser to push through advertising and communication to the customer's mobile device in return for a discount on ordering food and/or beverages at the venue. Following the first advertisement on the electronic digital display 210, a second advertising image and/or video may be displayed for the patron. At the end of the second advertisement, instructions may be provided to the patron to visit an external website or mobile application on the patron's personal mobile device. A QR code or access code may be displayed on the electronic digital display 210, for the patron to enter at the website or application. In one aspect, the QR code or access code may allow the customer to receive a discount, access special offers, or allow the advertiser to push through advertising and communication to the customer's mobile device in return for a discount on ordering food and/or beverages at the venue. Following the second advertisement on the electronic digital display 210, a third advertising image and/or video may be displayed for the patron. At the end of the third advertisement, instructions may be provided to the patron to visit an external website or mobile application on the patron's personal mobile device. A QR code or access code may be displayed on the electronic digital display 210, for the patron to enter at the website or application. In one aspect, the QR code or access code may allow the customer to receive a discount, access special offers, or allow the advertiser to push through advertising and communication to the customer's mobile device in return for a discount on ordering food and/or beverages at the venue. This process of displaying an advertisement through the electronic digital display 210 is continued and repeated throughout the course of the event. In one aspect, the remote server may be used to power down the device and electronic digital display 210, if after cycling through the pre-programmed advertisements and offers, the process is unable to engage the patron in any interaction. Alternatively, the process of displaying an advertisement through the electronic display 210 may be looped ad infinitum, or numerous different advertisements from many different vendors, sponsors, or advertisers may be shown. In another aspect, the server or remote server may be used to choose, tailor, and select specific advertisements based on the location of the device in the venue to target patrons based on the seat price of the section and row they are seated in, or other previously or currently connected data. Advertisements may also rotate based on pre-programmed timelines (e.g. before the end of a quarter or halftime; or, the two minute warning in football; or the seventh inning stretch in baseball) or custom timelines received from the server or remote server.

Figure 8A:
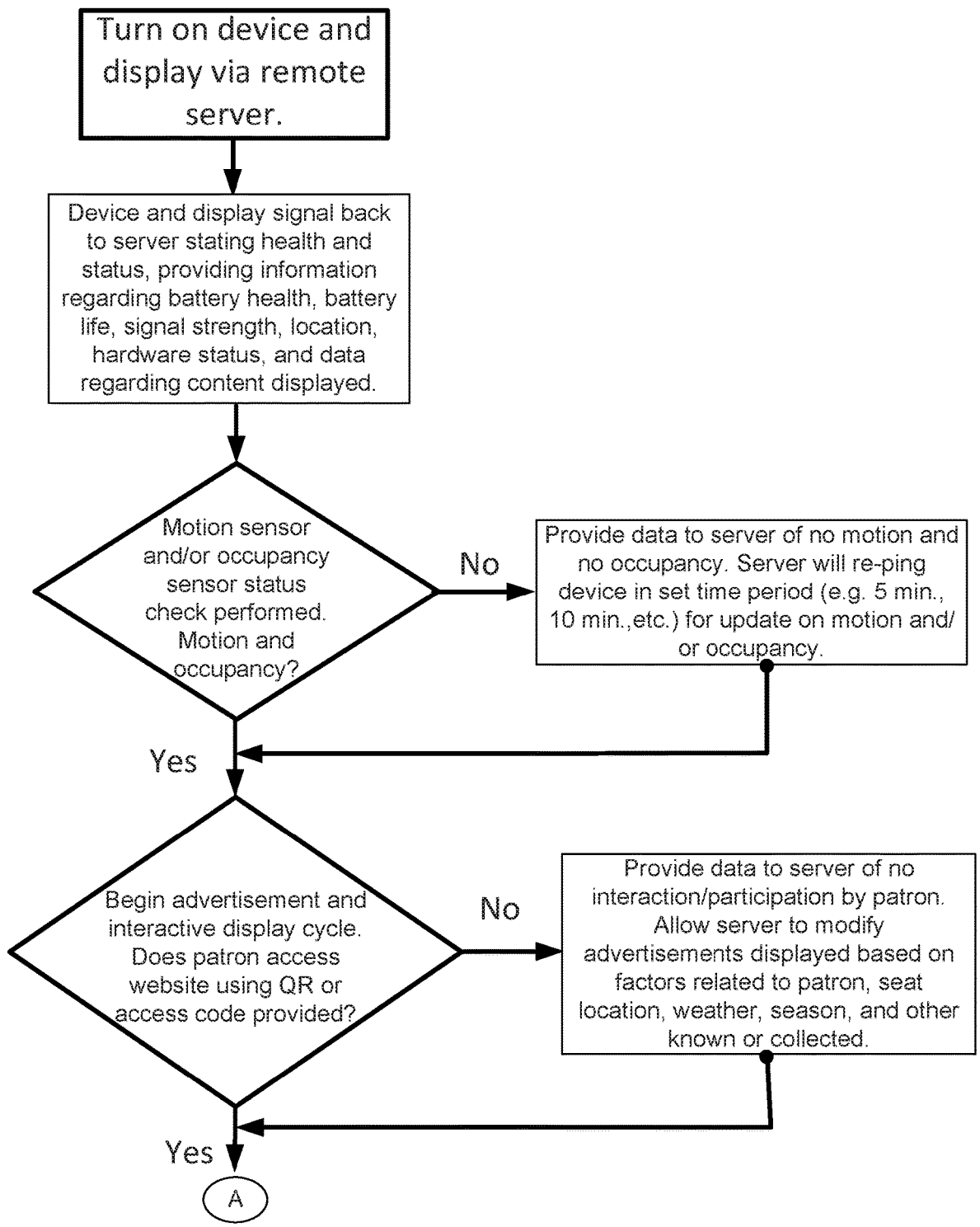
FIG. 8, includes FIG. 8A, FIGS. 8B, and 8C, and provides a methodology for operating the advertising display apparatus.

FIGS. 8A, 8B, and 8C provide an optional method for operating and controlling one or a network of advertising apparatuses at a public venue. Initially, the single board computer and display are powered on via a command signal sent from a server. In some instances, this server is a remote server and in other instances the server is located and operated at the venue. The process for powering on the devices is wired or wirelessly enabled by using 3G, 4G or 5G wireless communication technology, WiFi (e.g. 801x type standard), Bluetooth®, or Low Energy Bluetooth (LEBT). After being powered on, the device and electronic digital display 210 signal back to the server stating the health and status of the device and display 210, including but not limited to information regarding battery health, battery life, signal strength, location, hardware status, and data regarding content displayed. Next, a motion sensor and or occupancy sensor status check is performed by the sensors located in the seating envelope 100. The data from this check is then provided to the server. In the event no motion or occupancy is detected by the sensors, the server may re-ping the device and display in set time periods (e.g. 5 mins, 10 mins.) for an update on motion and/or occupancy in the particular location. If the motion and occupancy is confirmed then the advertisement and interactive display cycle is started. If the patron does not access any websites using QR codes or access codes provided, data is transmitted to the server that no interaction or participation has been performed by the patron. This information allows the server to then modify the advertisements displayed to the patron based on factors related to the patron, seat location, weather, season or time of year, and other data known, collected, or even surmised about the patron, or similar demographics of patrons.

FIG. 8B provides an optional method for allowing the patron to exit from the advertising display cycle to a concession menu viewed on the electronic digital display 210. In some implementations, the device and server may work in conjunction to ensure that the patron has not exited the advertising display by placing a time limit (e.g. 5 mins.) to place a concessions order before returning the patron to the advertising and display cycle. If the patron, does order food, beverage, and/or a souvenir order, the information regarding the order is sent to the server from the device where it is processed and provided to a venue central management system, which includes information on the patron's location in the venue, so that the food, beverages, and souvenirs may be delivered to the appropriate patron at the appropriate location. Meanwhile, the patron may provide payment information via a Near Field Communication (NFC), tap-and-go, contact less credit card, traditional debit or credit card, alternative payment method such as Venmo, SquareCash, or cryptocurrency, or alternatively, the venue may optionally allow a patron to pay by cash at the time of delivery of the food, beverage, or other purchased items. One aspect of such a system would allow the operator of the venue to decide, control, and customize the different types of payments that are acceptable to the management of the venue. In certain circumstances, the operator may choose to disable payments by cash to avoid inconveniences or abuse of the concession menu access. This type of method which may allow a patron to order and receive food, beverage, and souvenirs without leaving their seats, may prove beneficial to both the patrons and the venue operators.

In an alternative implementation, one or more of a Near Field Communication (NFC) technology and radio-frequency identification (RFID) technologies (more generally contactless payment systems including Samsung Pay, Apple Pay, Google Pay, or any bank mobile application that supports contactless payment), may be configured and operably disposed in one or more of the technology storage locations described in FIGS. 1, 2, inter alia. In this implementation, a patron may use an app on their own personal mobile device, or in some instances the digital advertising display, and then pay by moving their contactless payment method (whether mobile device or contactless credit card) in to close proximity of the reader or receiver that may be integrated with, on, or in an advertising device described herein. Thus, the patron may be able to place an order for concessions securely from their seat using a contactless payment method and the venue would be able to confirm the exact location (i.e. section, row, and seat) and thus an attendant may be able to deliver the ordered items to the patron.

FIG. 8C provides an optional method for returning the patron to the advertising and display cycle of the electronic digital display 210. At the conclusion of an event, data collected during the event may be compiled and advertising interactions and concessions orders may be transmitted to the server or remote server for aggregation and analysis. Subsequently, the data files are closed, and data collection is stopped. Finally, the device and display may be remotely powered off via a wireless signal from the server or remote server.

Figure 9:
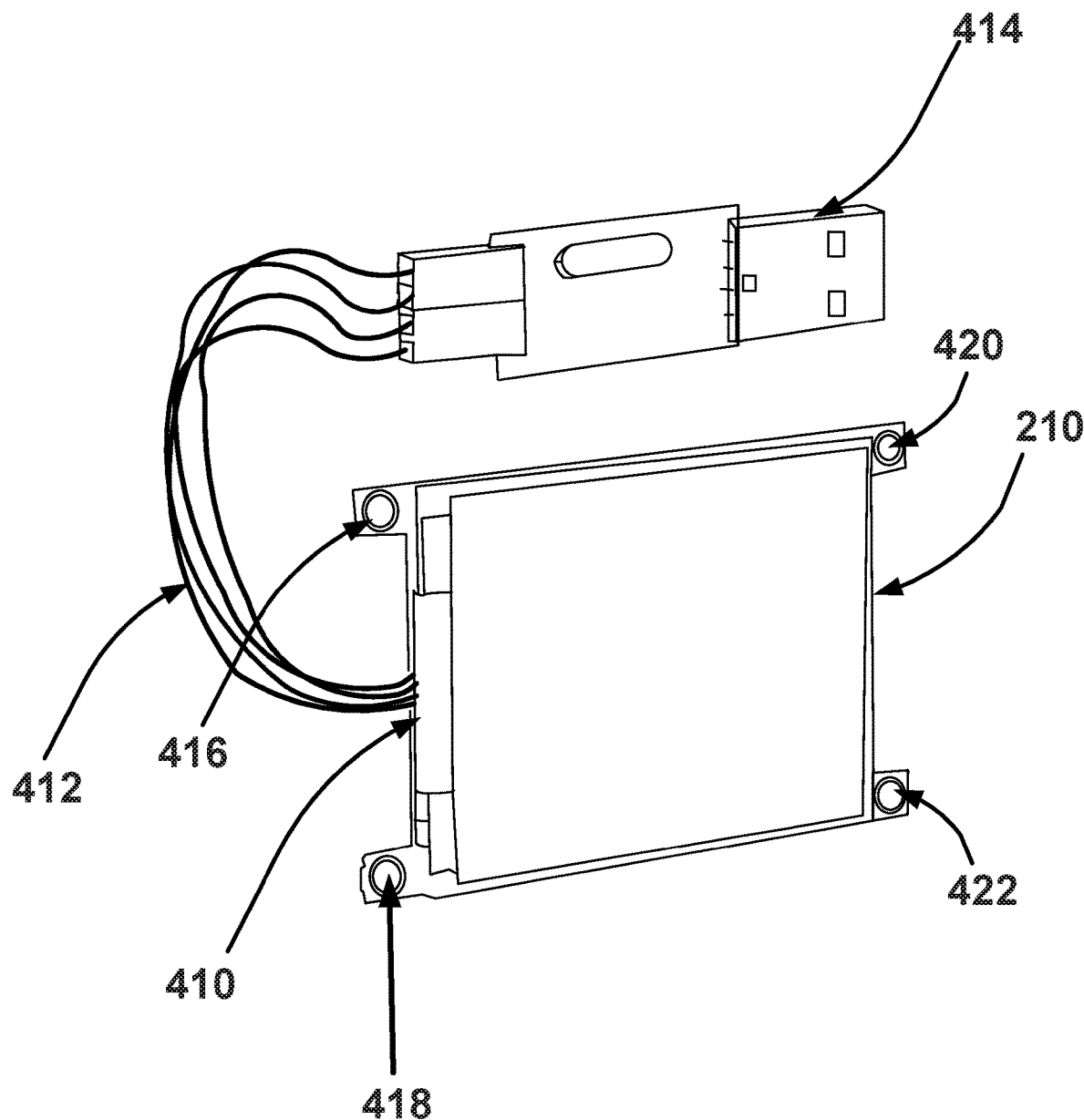
FIG. 9 provides a schematic of a development used in the advertising display apparatus hereof.

FIG. 9 provides a schematic of a development used in the electronic digital display 210 apparatus hereof. In some aspects, the electronically enabled display which may be black and white, grayscale, partial color, or full color, and may include an LCD (liquid crystal display), LED (light emitting diode), OLED (organic light emitting diode), AMOLED (active-matrix organic light-emitting diode), plasma or PDP (plasma display panel), an e-ink display, or an e-paper display. In some implementations there may be one, two, three, or more electronic displays connected to or incorporated with the advertising apparatus. In some implementations of the developments hereof, a main display panel may be a different type of display than other panels that are disposed in the seating envelope. For instance, in implementations that have more than one electronic display, a main display may be in color and provide for video, touch screen and interactive functionality with the patron via a touch screen while other displays such as those disposed in a cupholder, seat back, or other structures may be an e-ink or e-paper display. In some implementations, the display is curved or flexible such that it can be fit to the external structure of a smooth-curved apparatus or wrap-around type of display such as an appurtenant panel or face of a cupholder. The display may have a flex cable 410 that connects the display 210 to electronics and circuitry required for operation of the display (not pictured). In some instances, the display 210, may be connected via wires 412 to an USB connection 414 which may enable the display 210 to be operably connected to a single board computer (not shown in FIG. 9). In some implementations, the display has latches or holes 416, 418, 420, and 422 that facilitate the display 210 being latched, mounted, or affixed in its desired location.

Figure 10A:
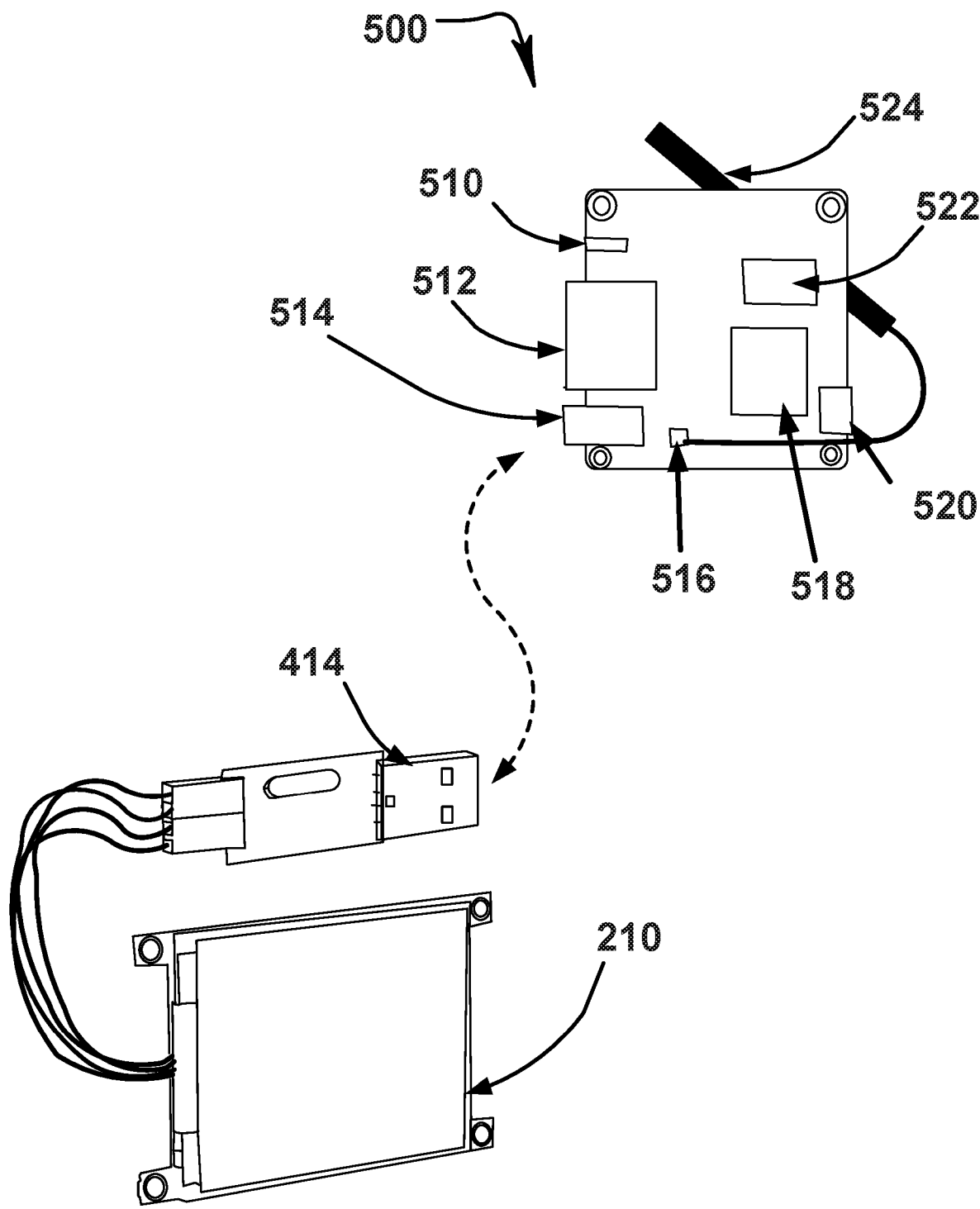
FIG. 10A, FIG. 10B, and FIG. 10C are schematic block diagrams of electronics used in the advertising display apparatus hereof.

FIG. 10A provides a schematic diagram of an exemplar single board computer 500 and demonstrates how a display 210 may be connected therewith. The single board computer 500 may optionally contain a debug serial port 510, a 100M ethernet port with built in power supply 512, a USB 2.0 or 3.0 connection 514, a WiFi module 516, a CPU or processor 518, a discrete OTG+ power supply 520, random access memory 522 (RAM—DDR RAM, DDR2 RAM, or DDR3 RAM) of 256 MB, 512 MB, or 1024 MB or greater capacity, and an antenna 524 which is operably connected to the WiFi module. This schematic should not be construed to be limiting as more, less, or different components and configurations may be utilized for the developments hereof so long as the single board computer 500 and associated electronics are capable of performing the functions for the desired applications in a specified implementation or embodiment. It should be noted that in this particular implementation, the USB connection 414 may be connected to the USB 2.0 or 3.0 connection 514 to provide to the signal from the single board computer to the display 210. In other implementations, not shown in FIG. 10A, the display may be wirelessly connected, or connected via other wired connections (e.g. CAT5) or other connections known to those of skill in the art.

Figure 10B:
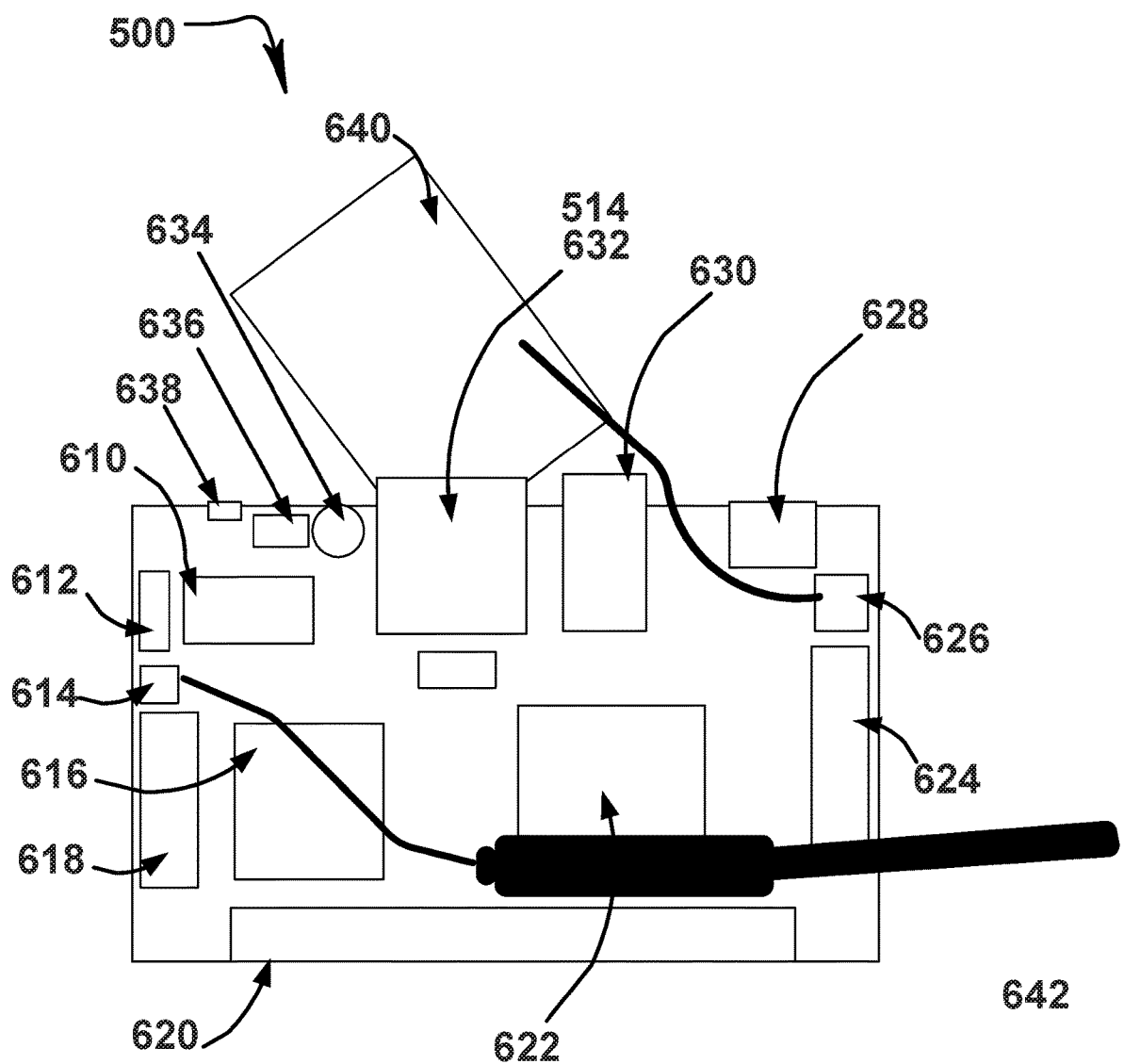

FIG. 10B provides a schematic diagram of yet another exemplar single board computer 500. The single board computer 500 may optionally contain a debug selector switch 610, a boot selector 612, a WiFi antenna 614, a WiFi+Bluetooth module 616, a CSI 618 for connecting a camera or video input, a 40-pin header 620, a CPU 622 (such as an ARM Cortex—A5 32 bit processor), a display connection port 624 (for LCD, LED, OLED, e-paper or e-ink, or other digital displays described elsewhere herein), a 2G, 3G, 4G, or 5G antenna connection 626 for connecting to wireless telephonic networks, a power supply 628 (in some instances an OTG+ power supply), an earphone, MIC, and FM jack 630, a USB 2.0 or 3.0 port 514, 632, a microphone 634, a power key 636, a speaker 638, and a 2G, 3G, 4G, and/or 5G antenna 640. This schematic should not be construed to be limiting as more, less, or different components and configurations may be utilized for the developments hereof so long as the single board computer 500 and associated electronics are capable of performing the functions for the desired applications in a specified implementation or embodiment.

Figure 10C:
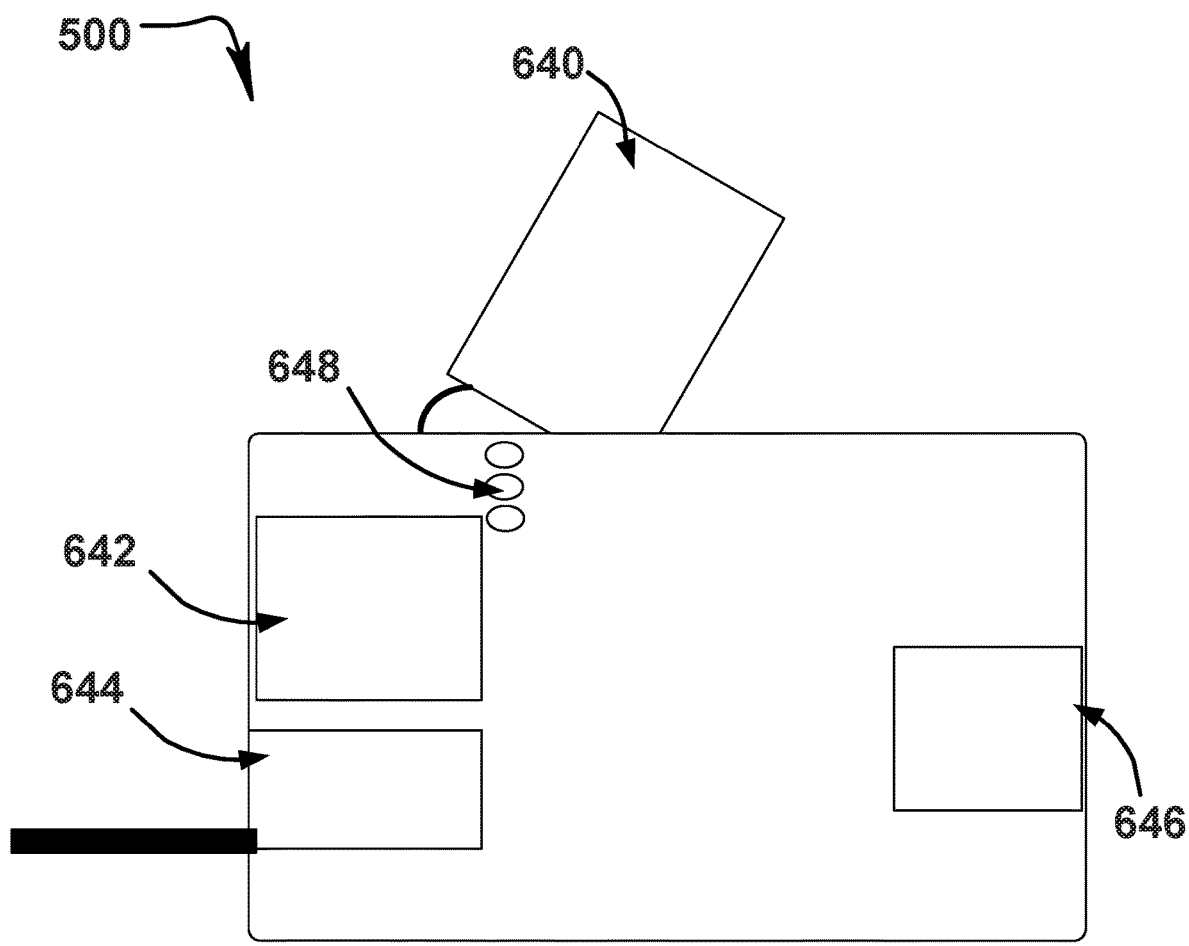

FIG. 10C provides yet another schematic diagram of the under side of the single board computer 500. The single board computer may optionally contain a sim card slot 642, a 2G, 3G, 4G, or 5G module 644, a TF card slot 646, and connections for a battery 648. The 2G, 3G, 4G, and/or 5G antenna 640 is also visible in this schematic. Although not shown in FIG. 10A, B, or C, the developments hereof may include the integration of an RF harvesting chip, chips, or modules that may be operably attached to the single board computer, that may in some instances be used to power the single board computer. Alternatively, an RF harvesting chip, chips, or modules may be operably attached to the electronic digital display to provide power to the electronic digital display. Moreover, in some instances alternatively, a WiFi harvesting chip may be used to power the single board computers, electronic digital displays, motion sensors, battery chargers, video links, and/or occupancy sensors that may utilized with the system. Furthermore, in some instances alternatively, a solar panel or photo-voltaic cells, may be configured and operably connected to the system so that sunlight may be used as a source of energy to generate direct current electricity, that may optionally be used to charge a battery (e.g. lithium ion) that is operably connected and used to provide power to the single board computer and digital display. In other instances power may be provided by being connected to the electrical system provided by the venue.

Figure 11A:
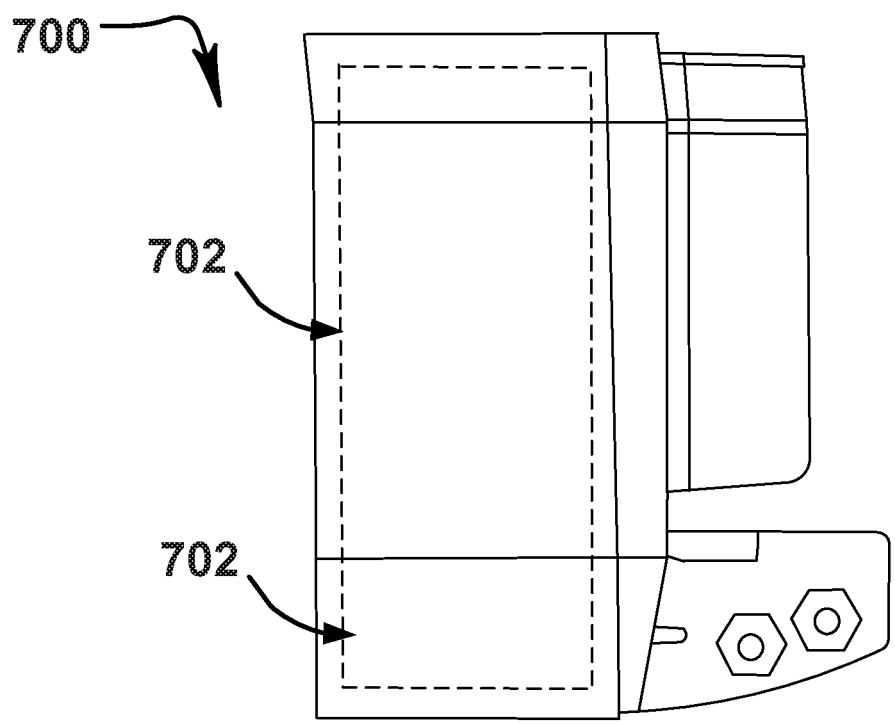
FIG. 11, which includes FIGS. 11A and 11B, provides elevation views from the respective sides of two modular adjustable mountable brackets.
Figure 11B:
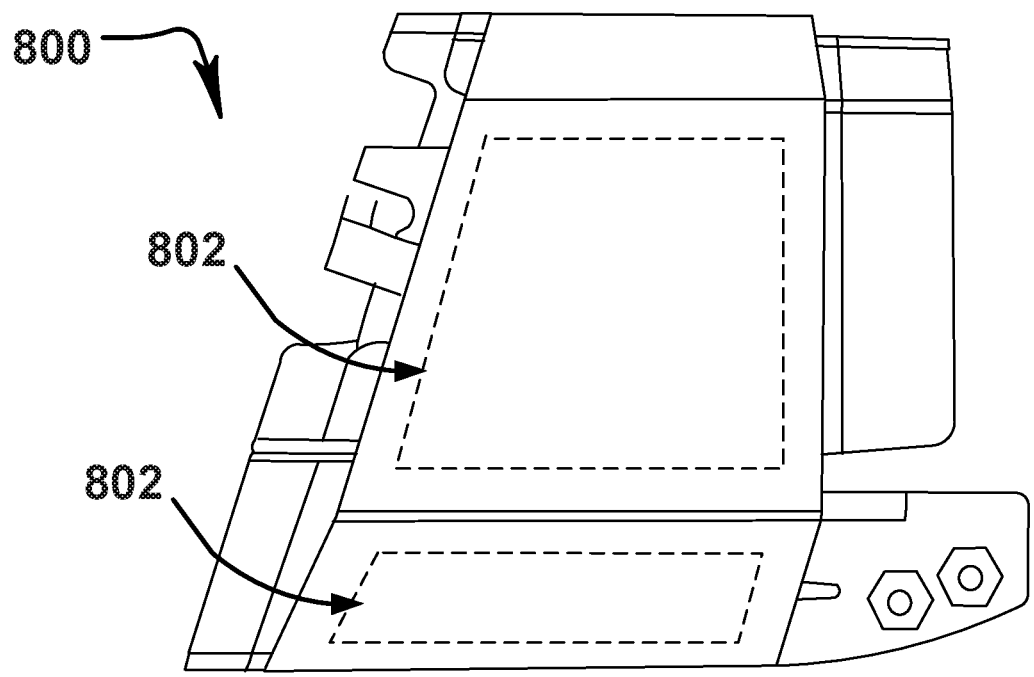

FIG. 11A provides a mounting bracket 700 (also referred to in some instances as a mountable bracket) with technology storage 702 built in to the mounting bracket. In this aspect, the technology and electronics may be concealed directly in the mounting bracket. This mounting bracket may have adjustable features which may allow the tilt or cant to be adjusted or modified. FIG. 11B provides an angled mounting bracket 800 (also referred to in some instances as an angled mountable bracket) with technology storage space 802 built in to the mounting bracket. In this aspect, the technology and electronics may be concealed in the mounting bracket. This mounting bracket may have adjustable features which may allow the tilt or cant to be adjusted or modified. An attachment such as a cupholder, flag pole holder, personal electronic device holder, or other mountable attachment may be disposed with and operably connected to a mounting bracket 700, 800.

Figure 12:
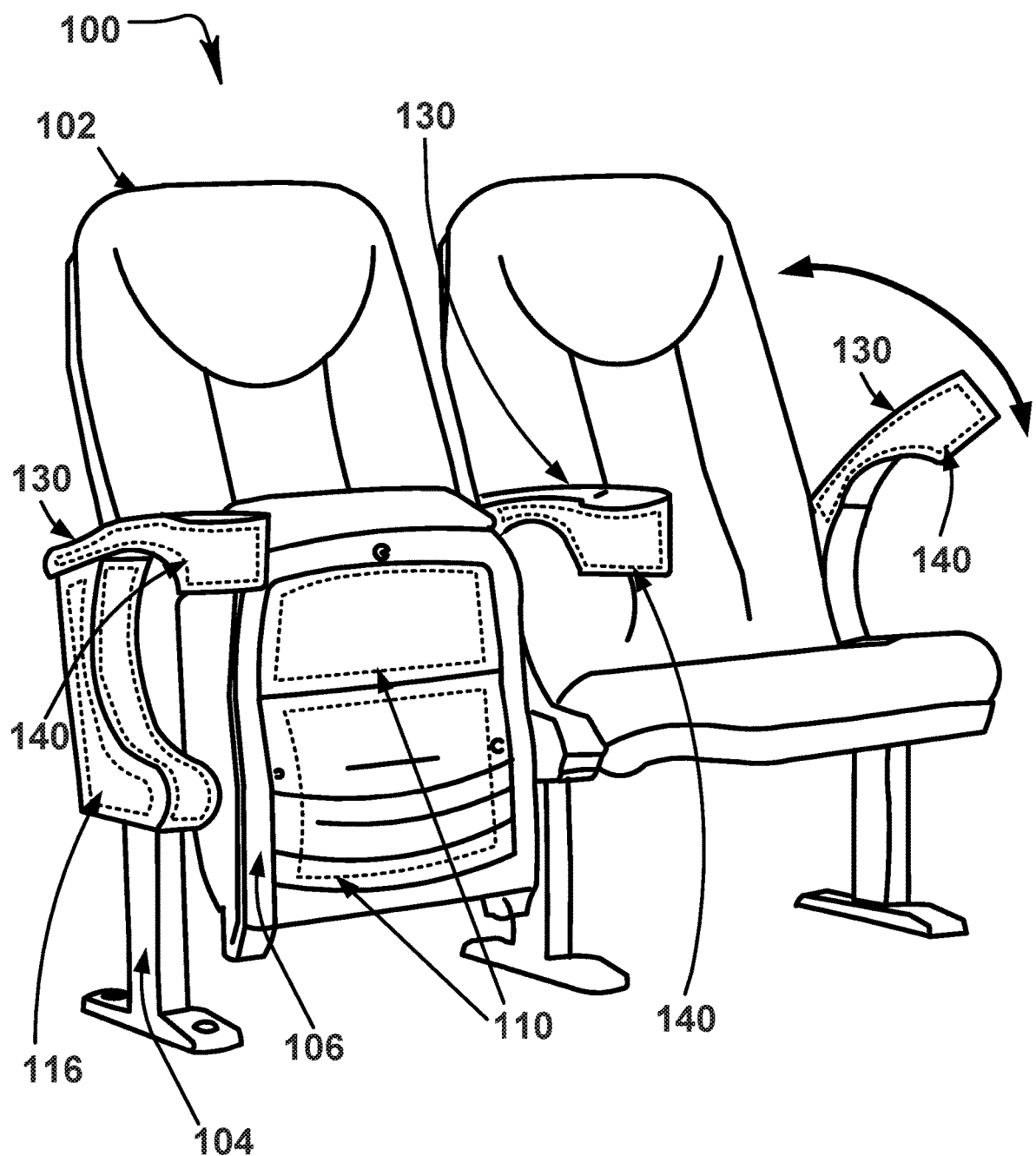
FIG. 12 provides an isometric view of a seat support structure, back of seat, bottom of seat, and armrests that provides the structure and housing for an accessible cavity for storage of technology and electronics within a bottom and armrest of a seat.

FIG. 12 provides an isometric view of a seat support structure, back of seat, and bottom of seat that provides the structure and housing for an accessible cavity for storage of technology and electronics within a back and bottom of a seat. The seating envelope 100 may be comprised of a seat back 102, a seat support structure 104, a seat bottom 106, and armrests 130, and other elements such as one or more seat stanchions, bleachers, risers, cupholders, mounting brackets, mountable holder assemblies for beverage and food holding, concession trays, container holders, advertisement displays, and other elements that are not shown or described in this FIG. 12. In one implementation of an advertising apparatus disclosed herein, accessible seat bottom cavities for technology storage 110 may be disposed in the seat bottom 106. Additionally, the armrests 130 may be used for armrest technology storage 140 compartments, chambers or cavities. It should be noted, that in some implementations the armrest 130 is a moveable and adjustable. The armrest 130 is shown to be rotatably mounted to the seat support structure; however, the armrest may alternatively be extendable and/or retractable, and in some instances raiseable. FIG. 12 also provides another example of storage cavity for technology inside the side support 116.

Figure 13:
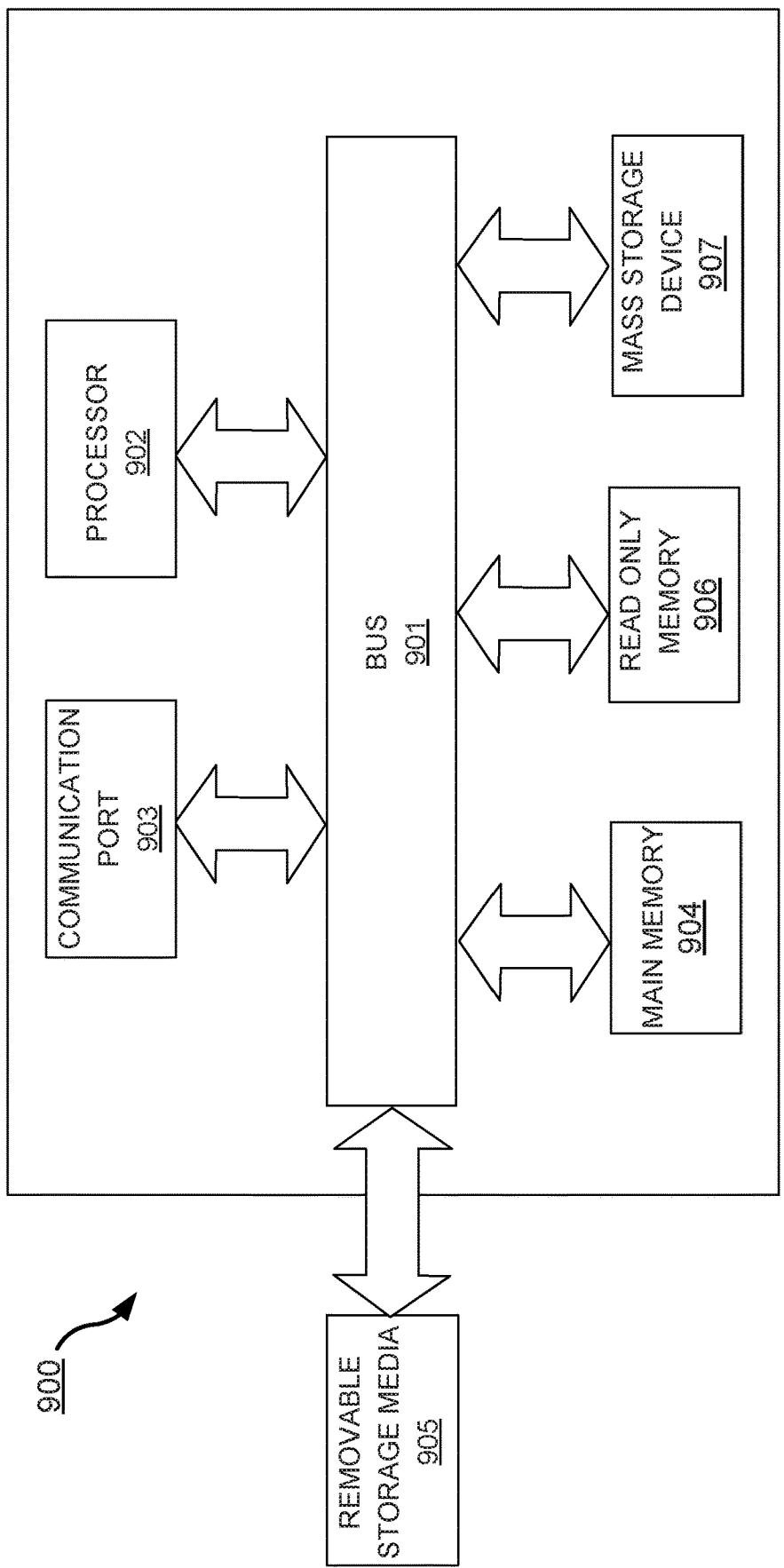
FIG. 13 illustrates an exemplary computer system or computing resources with which implementations hereof may be utilized.

FIG. 13 provides an example of computing resources or a computer system 900 with which implementations hereof may be utilized. Some of the implementations of the present developments include various steps, such as those described in FIG. 7 and FIGS. 8A-8C, and a variety of these steps may be performed by hardware components or may be embodied in machine-executable instructions, which may be used to cause a general-purpose or special-purpose processor programmed with instructions to perform the steps. Alternatively, the steps may be performed by a combination of hardware, software, and or firmware. Thus, FIG. 13 provides computing resources or a computer system 900 that may be utilized with the implementations and developments disclosed herein. According to the present example, such a computer system 900 may include a bus 901, at least one processor 902, at least one communication port 903, a main memory 904, a removable storage media 905, a read only memory 906, and a mass storage 907. More or fewer of these elements may be used in a particular implementation hereof.

Processor(s) 902 can be any known processor, such as, but not limited to, an Intel® Atom® Processor x5 or x7 Cherry Trail, ARM Cortex-A72 or Cortex-A17, AMD® Ryzenn™, or other similar type processors. Communication port(s) 903 can be any of an RS-232 for use with a modem based dialup connection, a 10/100 Ethernet port, a Universal Serial Bus (USB) port, or a Gigabit port using copper or fiber. Communication port(s) 903 may be chosen depending on a network such as a Local Area Network (LAN), Wide Area Network (WAN), or any network to which the computer system 900 connects or may be adapted to connect.

Main memory 904 can be Random Access Memory (RAM), or any other dynamic storage device(s) commonly known in the art. Read only memory 906 can be any static storage device(s) such as Programmable Read Only Memory (PROM) chips for storing static information such as instructions for processor 902. In some instances, the implementation may include, for example, 1 GB, 2 GB, 4 GB, of DDR3 RAM, or 1 GB, 2 GB, 4 GB, or 8 GB of DDR4-3200 single-channel RAM.

Mass storage 907 can be used to store information and instructions. For example, hard disks such as Adaptec® family of SCSI drives, an optical disc, an array of disks such as RAID, or any other mass storage devices may be used. Alternatively, up to 64 GB of soldered eMMC storage may be utilized in other implementations.

Bus 901 communicatively couples processor 902 with the other memory, storage, and communication blocks. Bus 901 can be a PCI/PCI-X or SCSI based system depending on the storage devices used.

Removable storage media 905 can be any kind of external hard drive, including SD cards and microSD cards.

The components described above are meant to exemplify some types of possibilities. In no way should the aforementioned examples limit the scope of the developments, as they are solely exemplary of possible implementations.

Advertising apparatuses such as a seat attachment apparatus, adjustable modular mounting bracket, digital display, cupholder, personal effects holder, or a combination of two or more of these apparatuses may thus provide convenient and attractive ways to display advertising in such a manner as to make it highly visible to the consumer. In some instances, such as with an attachment apparatus base configured to be easily mounted and secured in a visible location, and often having one or more detachable advertising devices, either or both of a front portion for display of the advertising, and/or optionally an advertising emblem member portion for interchangeable display of advertising or other indicia. An ease and/or quickness of changing or replacing the front or emblem members can be attractive features for changing advertising or other indicia, either in semi- or substantially permanently installed dispositions of the base unit, and/or for the advantage of mass producing base members or units on a larger scale for alternative locale usage, with production of fewer of each of different advertising/indicia devices for different locales. Thus, molds would not need to be changed for base members carrying locale-specific information/advertising/indicia. Note, exemplar locales or markets for use hereof may including places where the seating envelope plays a role in creating a consumer's experience such as, stadiums and arenas (municipal, local, college or professional sports venues, raceways and e-gaming arenas, e.g.), churches, movie theatres, casinos, concert venues or mass transit.

As introduced above, a variety of alternative structures may implement the advertising/indicia changing methods and/or apparatuses hereof. Support structures may come in different forms, including but not limited to seat back structures of a variety of sizes, shapes and/or styles, cupholders, a portable device or mobile device attachment apparatus, a pole holder, or other storage or holding apparatus, armrests, and other structures that may be present or available in the seating envelope of a venue. Thus, the support structure may be free-standing or may be pre-attached to or may simply be a seat structure, such as a seat back or arm or other portion of a seat. Support structures may be on structures other than seats or otherwise. Free-standing structures may take many shapes depending upon a particular locale. Moreover, though retrofit apparatuses have been described in some implementations of the developments hereof, the scope and content hereof is not so limited, and instead may include base structures which may incorporate the typically relative "quick" change advertising replacement options described herein. Still furthermore, the connection mechanisms hereof are illustrative only as well and not limitative of the scope and content hereof. Other connection mechanisms for either display panels or emblem members may be used to the same or substantially the same effect, and thus be covered hereby.

Apparatuses hereof may be made by any of a variety of methods and/or of a variety of materials. In many instances, impact resistant and/or ultraviolet (UV) stable resin or material may be selected. Plastics molded to integral or unitary forms as shown herein may be typical, though other forms and materials may be used as well. Sonic welding and/or glues and epoxies may be used to achieve certain combinations of shapes as well. Moreover, any of many alternative colors and/or color schemes may be used, whether for matching team or other affiliation, or for matching locale usage. Shapes and sizes are not limited to those shown and described here either, as sizes and shapes may be selected to adapt to any of many alternative support structures. Also, embossing and/or debossing of messages, logos or alternative communicative or decorative features, as part of the manufacturing process on any one or more surfaces may also be used, as for one example on the top surface adjacent or in lieu of the emblem member. If plural parts are used, different colors and/or embossing or other schema may be used to enhance interchangeability.

The informational and advertising apparatus and system hereof also contemplates other aspects such as data acquisition, communication with a remote server, audio presentations, speakers, charging ports for portable devices, remote communication, photo cells, and i-beacons.

Furthermore, the developments hereof in some instances and implementations contemplate the use and integration of fragrances, scents, or aromas into any of the molded plastic products that are utilized for the apparatuses described. These fragrances may be utilized to impart a desired scent in to the general area of the seating envelope and generally improve the olfaction observed, perceived, and/or detected by the patrons of the venue or establishment. In some instances, the fragrance or aroma may be embedded in the molded plastics for the critical components of the advertising apparatus or body member. In other implementations the fragrance or scent may be embedded in a discrete attachable, detachable, and removable strip that is designed to be placed and secured in concealed, unobtrusive, inconspicuous, low-key, or other hidden positions such under a horizontal member of the seat structure, under a seat back, or under an arm or other portion of a seat. The developments hereof contemplate using scents such as fresh cut grass, popcorn, or other desirable scents that may improve the ambiance and environment observed and experienced by the patron. Moreover, in some settings the implementations contemplate the use of a discrete attachable, securable, and subsequently detachable strip that is designed to absorb malodors. These deodorizing strips may be similarly placed and secured in concealed, unobtrusive, inconspicuous, or other hidden locations within the seating envelope.

Although the present developments have been described with reference to preferred implementations, workers skilled in the art will recognize that one or more changes may be made in form and/or detail without departing from the spirit and scope of the claimed inventions.

What is claimed is:

1. A system comprising:
    at least one server having a processor, memory, and instructions configured for:
        transmitting signals to at least one electronic digital display associated with one or more of a cupholder, seat, seat support, or seat structure at a venue;
        distributing one or more of power or data connections through one or more cavities of the cupholder, seat, seat support, or seat structure;
        in response to transmitting signals to the at least one electronic digital display, receiving health and status data of the at least one electronic digital display;
        in response to receiving the health and status data, transmitting one or more of a selected static or dynamic visual output to be displayed on the at least one electronic digital display based on one or more of:
            location of the at least one electronic digital display in the venue,
            price of seat in a particular section and row of the venue, or
            events at the venue.

2. A system according to claim 1, further comprising one or more of:
- the at least one electronic digital display receiving one or more responses from a patron providing input to a network connected electronic digital display;
- the at least one electronic digital display displaying a unique QR code or access code to the patron and further receiving one or more responses from the patron;
- the at least one electronic digital display directing the patron to use the unique QR code or access code to access a website or application on the patron's mobile device;
- the at least one electronic digital display establishing a connection between a advertising apparatus and the patron's personal mobile device.

3. A system according to claim 1, the at least one electronic digital display further comprising a graphical user interface that enables a patron to place orders for one or more of food, beverages, souvenirs, tickets, and/or other goods sold at a public venue, the order placed by the patron being directed via the server to a central management system that directs and provides information regarding the patrons precise location in the public venue, including a section, row, and seat, for delivery of said one or more of food, beverages, souvenirs, tickets, and/or other goods.

4. A system of claim 1, the system further comprising a payment receiving module, said payment receiving module being operably configured to securely receive payment via one or more of a Near Field Communication (NFC) enabled device, a tap-and-go and/or contact less credit card, traditional swipe debit or credit card, and/or chip-and-pin debit or credit card, an alternative electronically enabled payment service, and/or cryptocurrency.

5. A system according to claim 4, further comprising establishing a communication connection between one or more of: the at least one electronic digital display, the payment receiving module, the server, and a patron's mobile device using one or more of: Bluetooth®, low energy Bluetooth (LEBT), Near Field Communication, WiFi, i-beacon, Infrared Wireless data (IrDA), Ultra Wideband (UWB), induction wireless communication, or a hard wired connection.

6. A system according to claim 5, further comprising one or more of notifying, publishing, or pushing additional content including one or more of advertisements, special offers, and/or event-only content to the patron's mobile device.

7. A system of claim 1 the at least one server further providing instructions to display and modify a sequence of image(s) and/or video advertisements.

8. A system of claim 1, the at least one electronic digital display being a touch screen operatively configured to receive input from a patron.

9. A system of claim 1, the at least one electronic digital display being communicably operative with a single board computer for measuring one or more of a response, engagement, or interest of a patron to an advertisement and communicating the measurement to the server for analysis.

10. A system of claim 1, further comprising a charging port or USB port to allow a patron to charge one or more of a personal mobile device or tablet and/or connect to the system via a wired connection.

11. A system of claim 1, further comprising a motion sensor or occupancy sensor.

12. A system according to claim 1, the health and status data further comprising information regarding battery health, battery life, signal strength, location, hardware status and data regarding content displayed.

13. A system of claim 1, the system further comprising informing or advertising in a public venue comprising one or more of:
- providing one or more commands from the server to one or more of the at least one electronic digital displays;
- selecting one or more informational content and/or advertisements from the group comprising images, videos, and audio-visual presentations;
- communicating and displaying the one or more of informational content or advertisements to the at least one electronic digital displays.

14. A system according to claim 1 further comprising one or both:
- the at least one electronic digital display measuring a response of a patron to an initial advertisement presented on the electronic digital display; and
- the server determining additional advertisements to communicate and/or display for a patron based on the measured response of the patron to the initial advertisements displayed.

15. A system according to claim 14, the server determining additional advertisements to communicate and/or display using one or both of artificial intelligence and/or machine learning to determine modifications to make to the advertisements displayed on the at least one electronic digital display.

16. A system of claim 1, the at least one electronic digital display being affixed or secured to one or more of the seat structure, a seat back, a seat bottom, cupholder, or a freestanding structure.

17. A system according to claim 1, the server providing one or more commands to the at least one electronic digital display for:
- powering on the electronic digital display.

18. A system of claim 1 further comprising one or more of:
- the at least one electronic digital display being separately controllable from any of the other electronic digital displays;
- at least one single board computer;
- at least one power source; or
- the at least one server configured to communicate with the at least one single board computer via a wired or wireless connection to provide discrete signals to one or more of:
- power on or power off the single board computer;
- power on or off the electronic digital display; or
- provide individualized display content,
wherein the single board computer and power source are configured to be stored in one or more of a seat back, a seat bottom, a seat structure, an arm rail, an armrest, a side support, a beam support and/or an anchor region of a seat support.

19. A system of claim 18, the single board computer being capable of being assigned an individual IP address or MAC addressable.

20. A system of claim 18, the power source being selected from one or more of the group comprising: a battery, a lithium-ion battery, a rechargeable battery, low voltage wired connection, a solar array, and a solar array connected to a battery.

* * * * *